United States Patent
Helmick et al.

(10) Patent No.: US 9,871,359 B1
(45) Date of Patent: Jan. 16, 2018

(54) SPLIT BACKSHELL FOR WIRE BUNDLES

(71) Applicant: The Boeing Company, Chicago, IL (US)

(72) Inventors: Eerik J. Helmick, Seattle, WA (US); Bradley J. Mitchell, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/472,581

(22) Filed: Mar. 29, 2017

(51) Int. Cl.
*H02G 3/04* (2006.01)
*B64F 5/10* (2017.01)

(52) U.S. Cl.
CPC ............ *H02G 3/0406* (2013.01); *B64F 5/10* (2017.01); *H02G 3/0481* (2013.01); *B64D 2221/00* (2013.01)

(58) Field of Classification Search
CPC .... B60R 16/0215; H02G 3/04; H02G 3/0406; H02G 3/0481
See application file for complete search history.

(56) References Cited

U.S. PATENT DOCUMENTS 5,245,133 A * 9/1993 DeCarlo ............. H02G 15/013
174/76
6,948,976 B2 * 9/2005 Goodwin ............... H01R 13/52
174/92
2008/0217056 A1 * 9/2008 Howard ................. H02G 9/065
174/88 S
2016/0365717 A1 * 12/2016 Lazic .................... G02B 6/4416

OTHER PUBLICATIONS

Digi-Key Electronics, "17 Position Circular Connector Plug, Female Sockets Solder Cup Silver" Manufactured by Amphenol Industrial Operations; http://www.digikey.com/product-detail/en/amphenol-industrial-operations/97-3108B-20-29S/97-3108B-20-29S-ND/2510073.

* cited by examiner

*Primary Examiner* — Hoa C Nguyen
*Assistant Examiner* — Amol Patel
(74) *Attorney, Agent, or Firm* — Perman & Green, LLP

(57) ABSTRACT

A backshell, the backshell including a first shell member having a first end, a second end and a first channel, a second shell member having a first end, a second end and a second channel, the second shell member being configured to interface with the first shell member so that, when interfaced, the first ends of the first and second shell members are adjacent each other and defines a backshell first end, the second ends of the first and second shell members are adjacent each other and defines a backshell second end, and the channels of the first and the second shell members form a wire bundle passage extending between the backshell first end and the backshell second end, and a coupling ring configured to engage both the first shell member and the second shell member at the backshell first end to couple the first shell member to the second shell member.

20 Claims, 16 Drawing Sheets

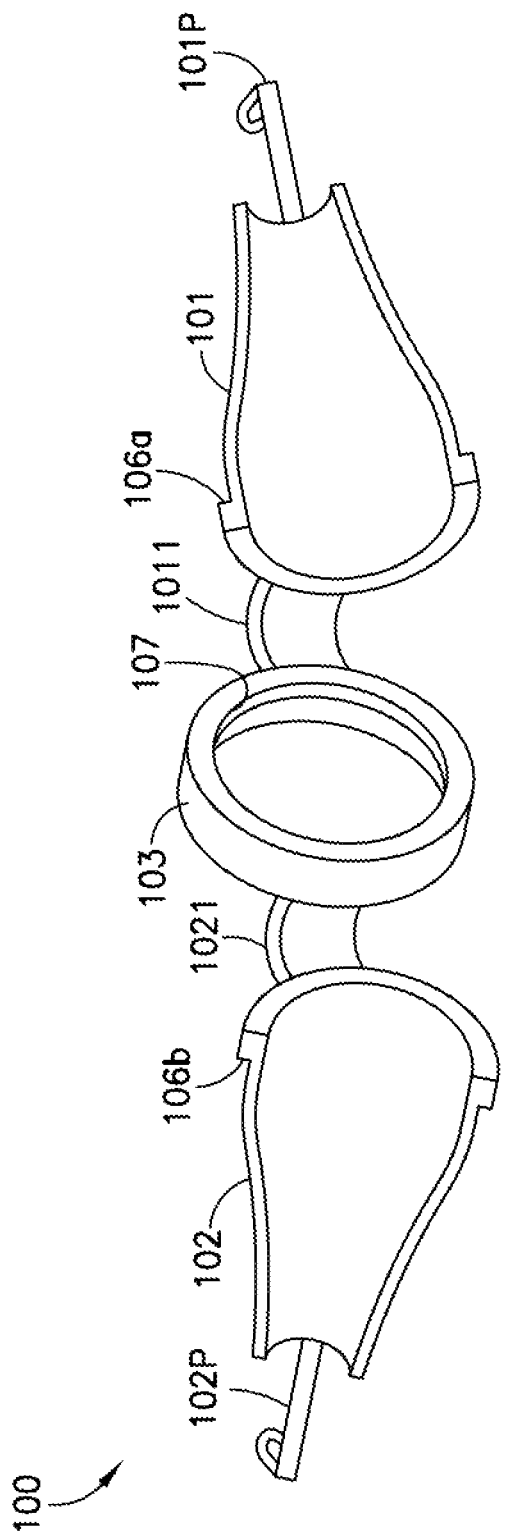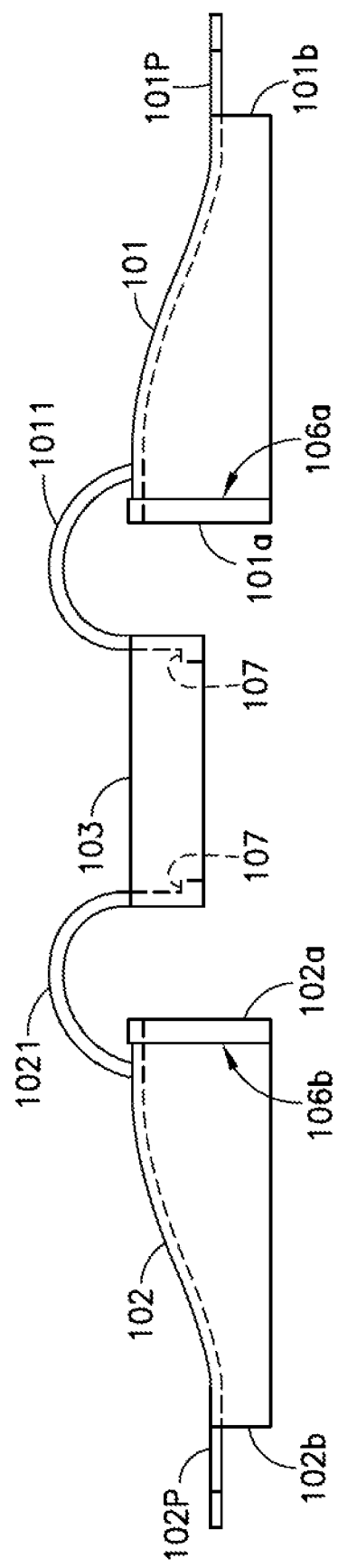
FIG.10A
FIG.10B

SPLIT BACKSHELL FOR WIRE BUNDLES

BACKGROUND

1. Field

The exemplary embodiments generally relate to backshells and in particular to split backshells for wire bundles.

2. Brief Description of Related Developments

Wire bundle forming for, e.g., an aircraft uses a manual approach increasing labor and cost for the production of the aircraft. The process of wire forming involves laying out connectors on a formboard and routing wires to their appropriate location (second end) on the formboard. As the wires are routed to the second end location, they are routed through backshells prior to insertion into an electrical connector.

Backshells provide a transition between a wire bundle and an electrical connector. The backshells provide benefits such as strain relief and ground paths for the wires. Strain relief backshells in particular provide a clamping force on the wire bundle to prevent damage to the wires of the wire bundle.

Generally, backshells comprise a solid cylindrical/tubular piece and are laid out prior to wiring to ensure the wire bundle is passed through the backshell. If a backshell is missed or not in place, the wires must be re-run.

SUMMARY

Accordingly, apparatuses and methods, intended to address at least the above-identified concerns, would find utility.

The following is a non-exhaustive list of examples, which may or may not be claimed, of the subject matter according to the present disclosure.

One example of the subject matter according to the present disclosure relates to a backshell for a wire bundle, the backshell including a first shell member having a first end, a second end opposite the first end and a first channel extending between the first end and the second end, a second shell member having a first end, a second end opposite the first end and a second channel extending between the first end and the second end, the second shell member being configured to interface with the first shell member at a parting line so that, when interfaced, the first end of the first shell member is adjacent the first end of the second shell member and defines a backshell first end, the second end of the first shell member is adjacent the second end of the second shell member and defines a backshell second end, where the parting line extends between the backshell first end and the backshell second end, and the first channel of the first shell member and the second channel of the second shell member form a wire bundle passage extending between the backshell first end and the backshell second end, and a coupling ring configured to engage both the first shell member and the second shell member at the backshell first end to couple the first shell member to the second shell member.

Another example of the subject matter according to the present disclosure relates to a backshell for a wire bundle, the backshell including a first shell member having a first end, a second end opposite the first end and a first channel extending between the first end and the second end, a second shell member having a first end, a second end opposite the first end and a second channel extending between the first end and the second end, the second shell member being configured to interface with the first shell member at a parting line so that, when interfaced, the first end of the first shell member is adjacent the first end of the second shell member and defines a backshell first end, the second end of the first shell member is adjacent the second end of the second shell member and defines a backshell second end, where the parting line extends between the backshell first end and the backshell second end, and the first channel of the first shell member and the second channel of the second shell member form a wire bundle passage extending between the backshell first end and the backshell second end, a coupling ring configured to engage both the first shell member and the second shell member at the backshell first end to couple the first shell member to the second shell member, and at least one clamp member configured to engage both of the first shell member and the second shell member at the backshell second end to couple the first shell member to the second shell member, wherein the at least one clamp member maintains the first shell member and the second shell member in a predetermined relationship relative to each other to prevent backshell first end removal from the coupling ring.

Still another example of the subject matter according to the present disclosure relates to a method of using a backshell, the method including angling a first shell member relative to a second shell member, where the first shell member has a first end, a second end opposite the first end and a first channel extending between the first end and the second end, the second shell member has a first end, a second end opposite the first end and a second channel extending between the first end and the second end, the second shell member being configured to interface with the first shell member at a parting line so that, when interfaced, the first end of the first shell member is adjacent the first end of the second shell member and defines a backshell first end, the second end of the first shell member is adjacent the second end of the second shell member and defines a backshell second end, where the parting line extends between the backshell first end and the backshell second end, and the first channel of the first shell member and the second channel of the second shell member form a wire bundle passage extending between the backshell first end and the backshell second end, inserting, with the first shell member and the second shell member angled relative to each other, the backshell first end through an aperture in a coupling ring, interfacing the first shell member and the second shell member at the parting line to form the wire bundle passage such that the coupling ring engages both the first shell member and the second shell member at the backshell first end to couple the first shell member to the second shell member, and coupling at least one clamp member to both of the first shell member and the second shell member at the backshell second end to couple the first shell member to the second shell member, wherein the at least one clamp member maintains the first shell member and the second shell member in a predetermined relationship relative to each other to prevent backshell first end removal from the coupling ring.

Still another example of the subject matter according to the present disclosure relates to a backshell for a wire bundle, the backshell including a first backshell member including a frame having an aperture through which the wire bundle passes, a circumferential outer surface, a first recessed channel disposed in the circumferential outer surface, and a second recessed channel disposed in the outer surface and intersecting the first recessed channel, a second backshell member having a first end and a second end, the first end configured to mate with the second recessed channel and form a portion of the first recessed channel, and a coupling member configured for insertion into the first recessed channel to couple the second backshell member to the first backshell member.

BRIEF DESCRIPTION OF THE DRAWINGS

Figure 1:
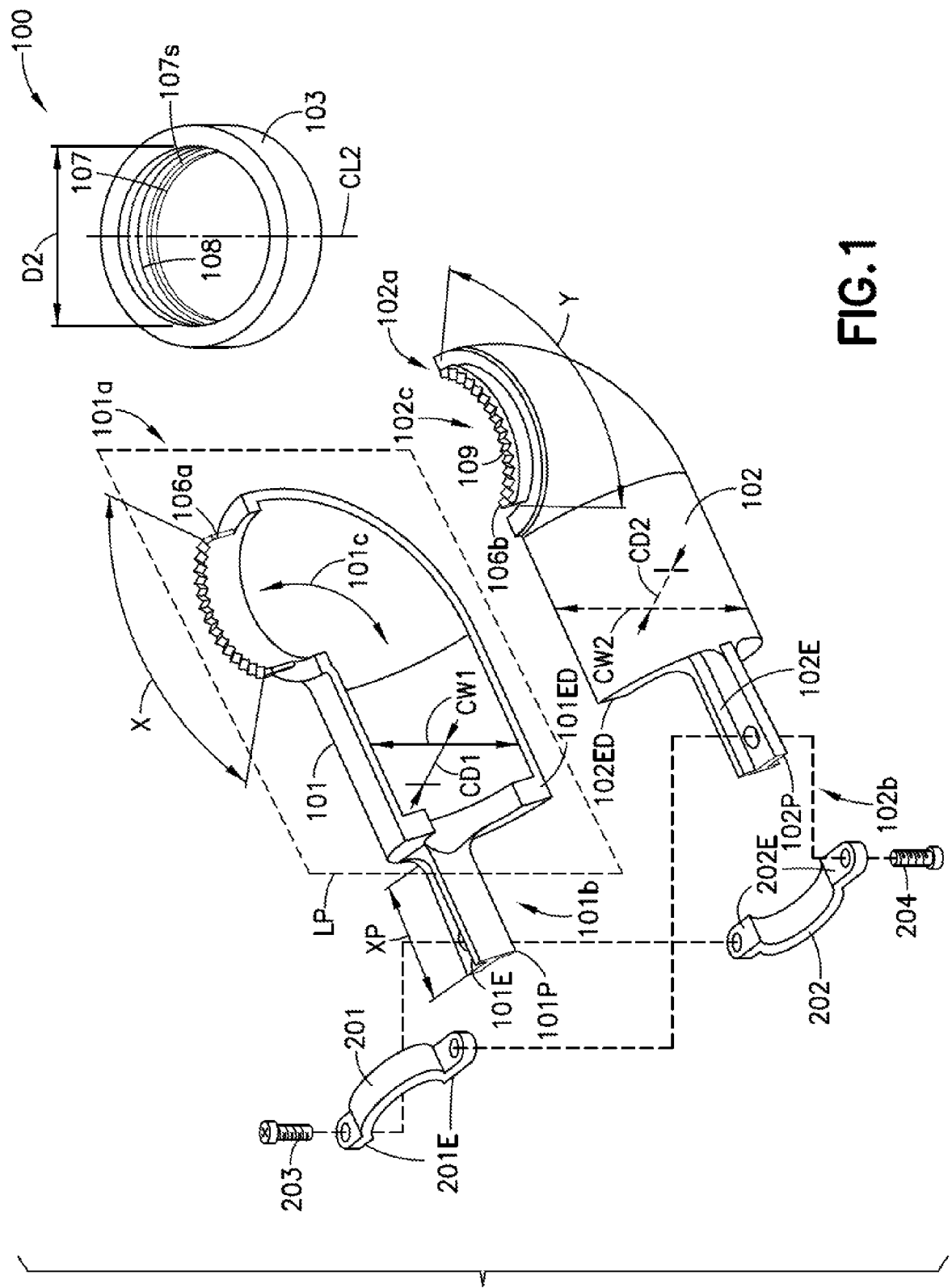
Figure 2:
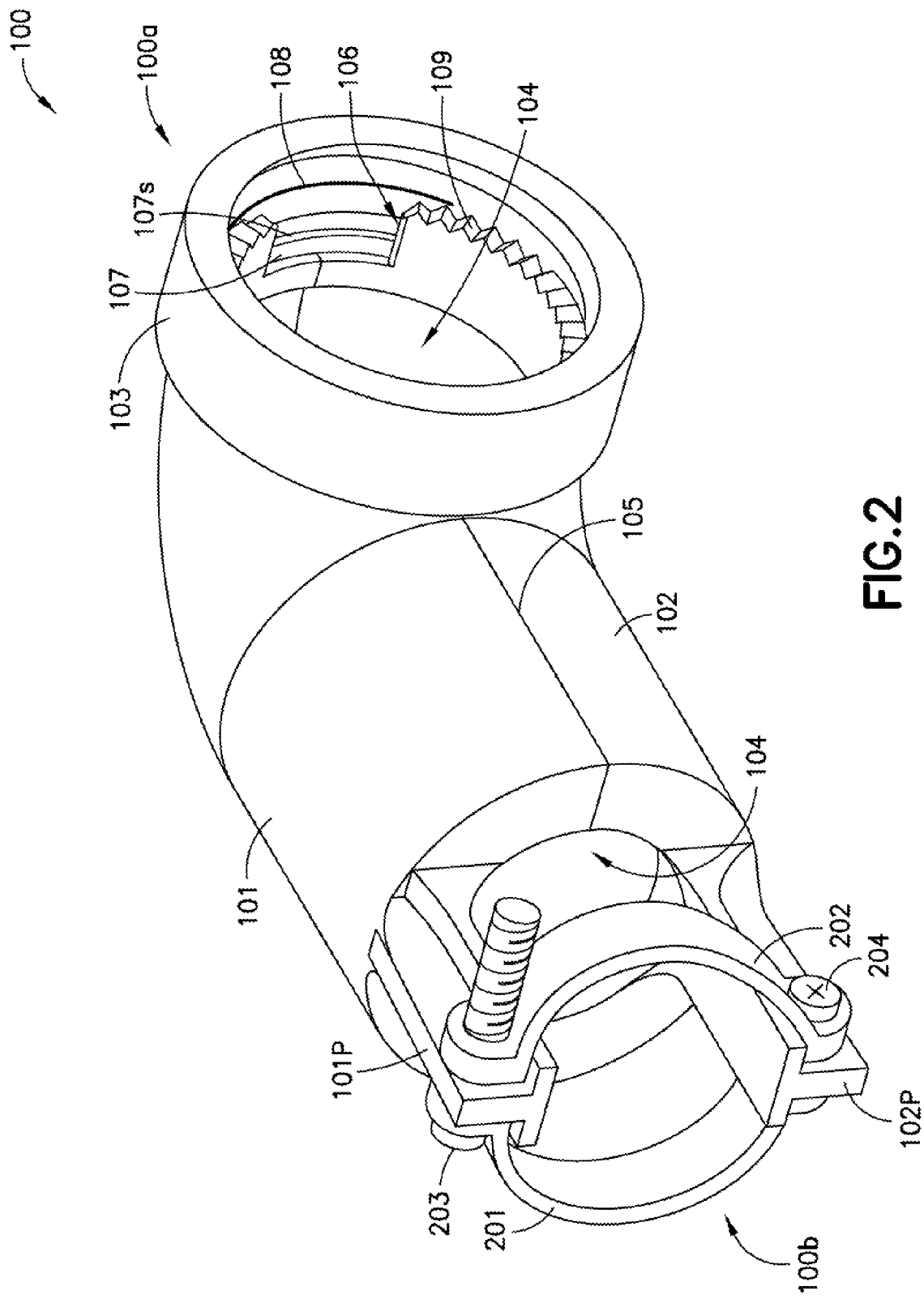
Figure 3:
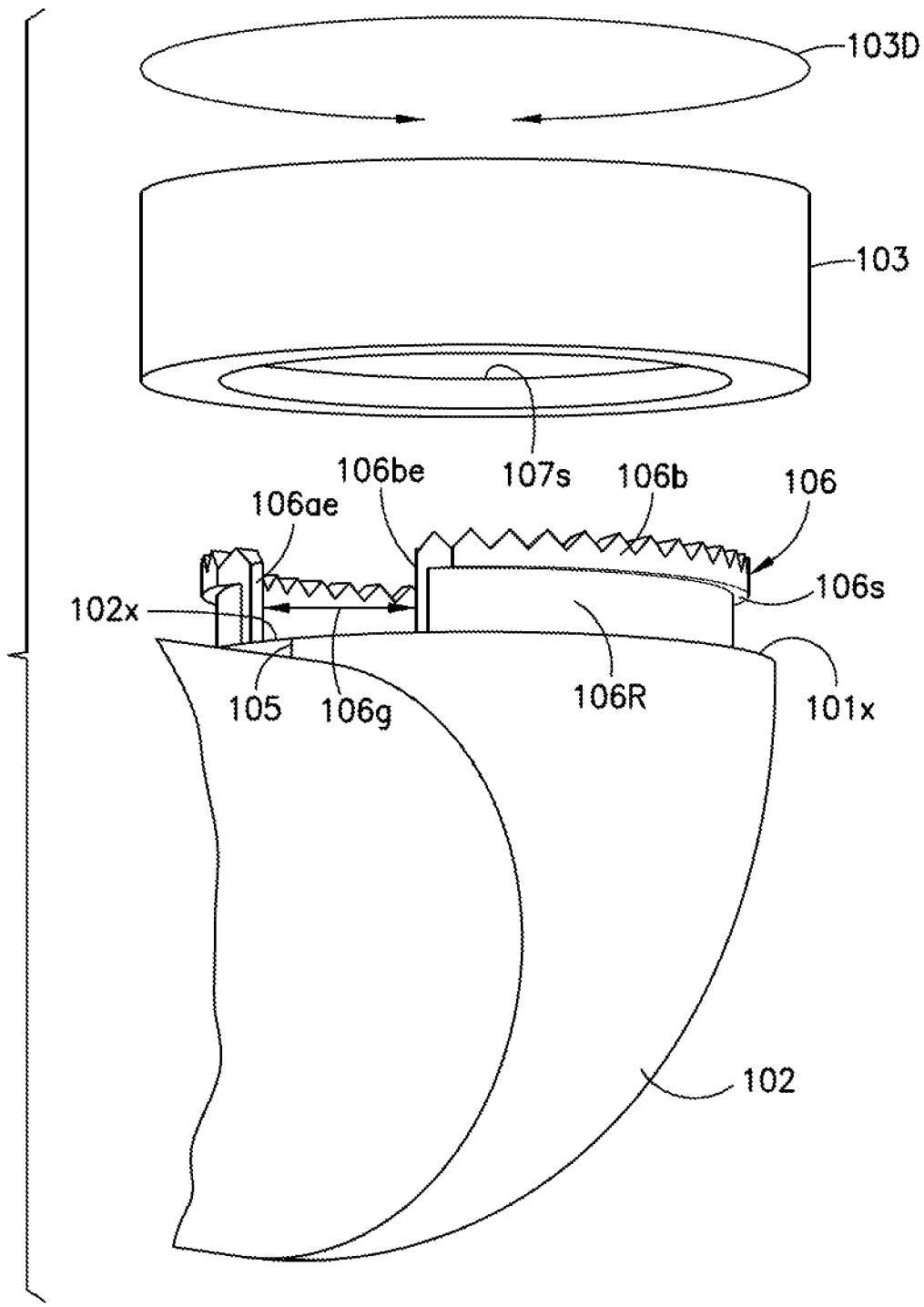
Figure 4:
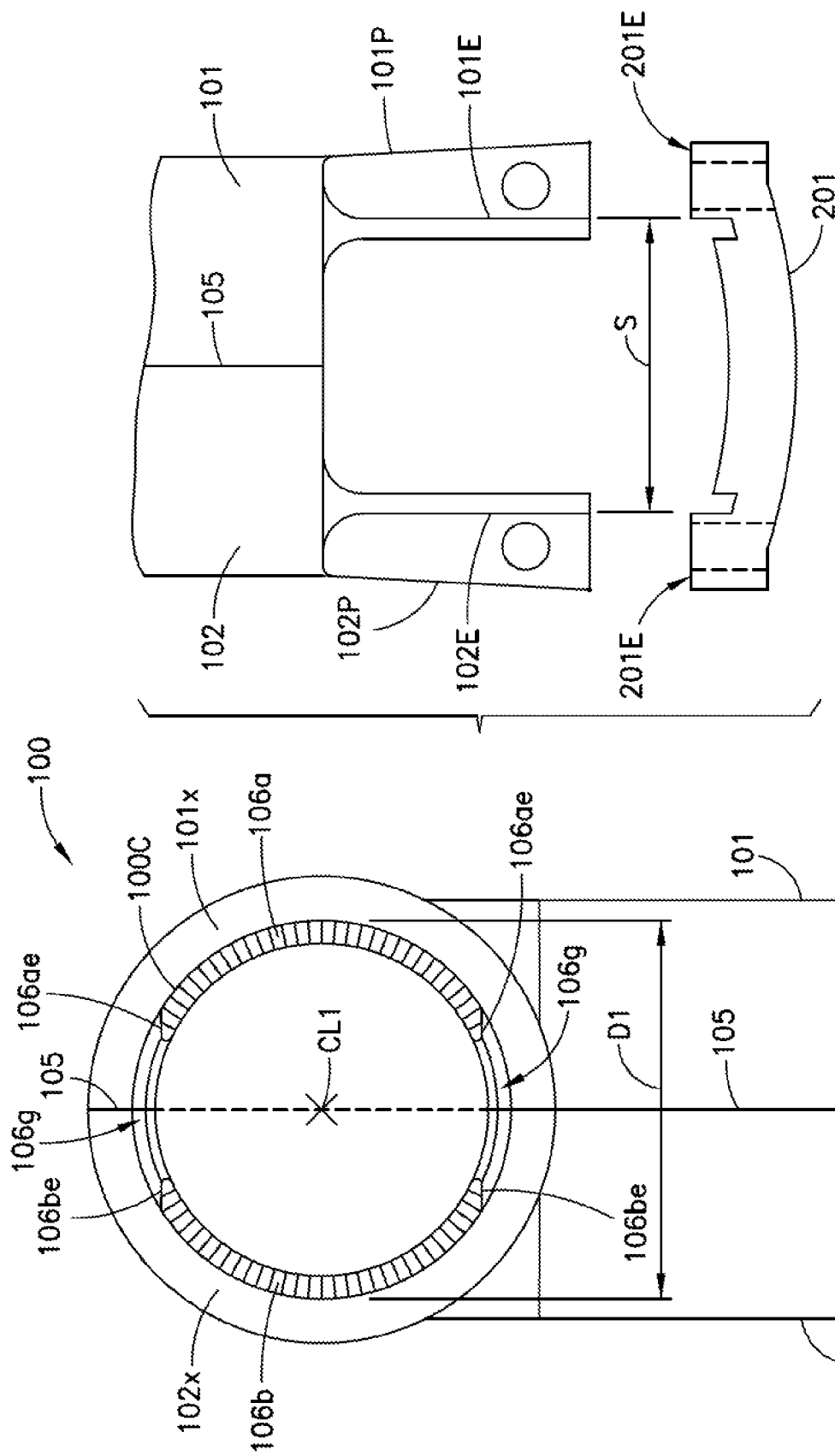
Figure 5:
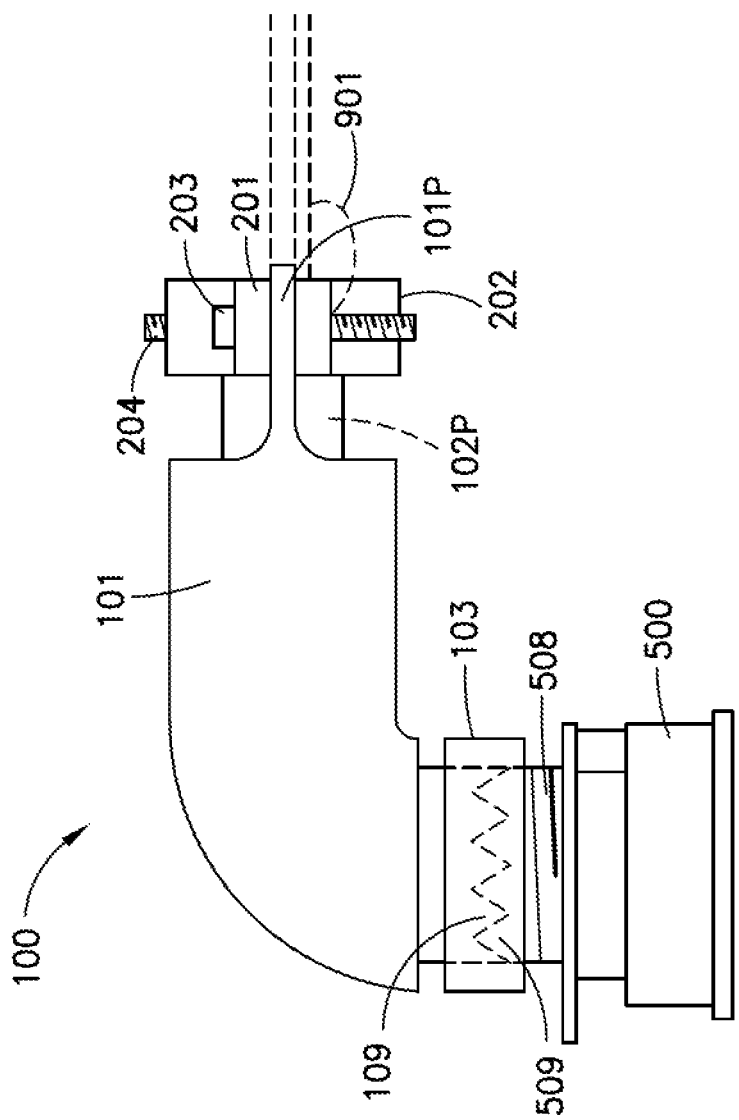
Figure 6:
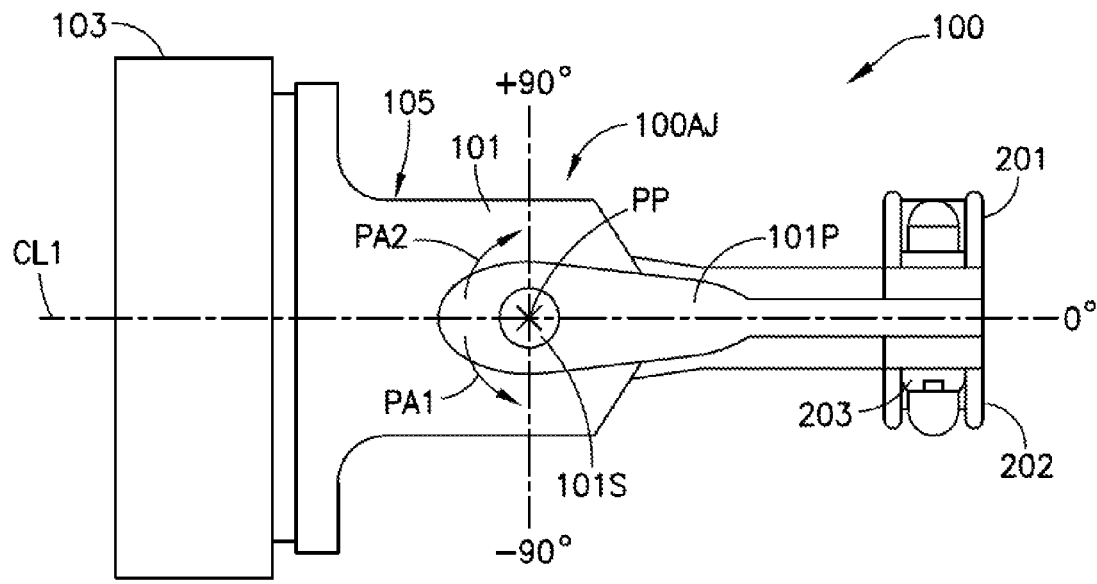
Figure 7:
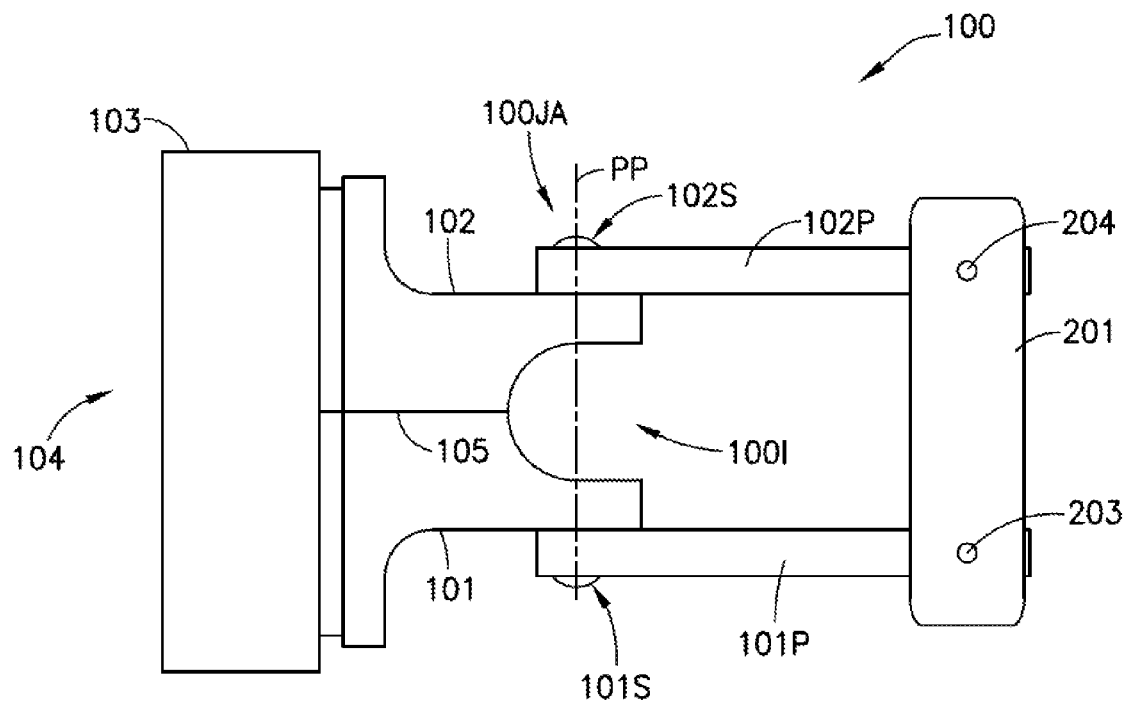
Figure 8:
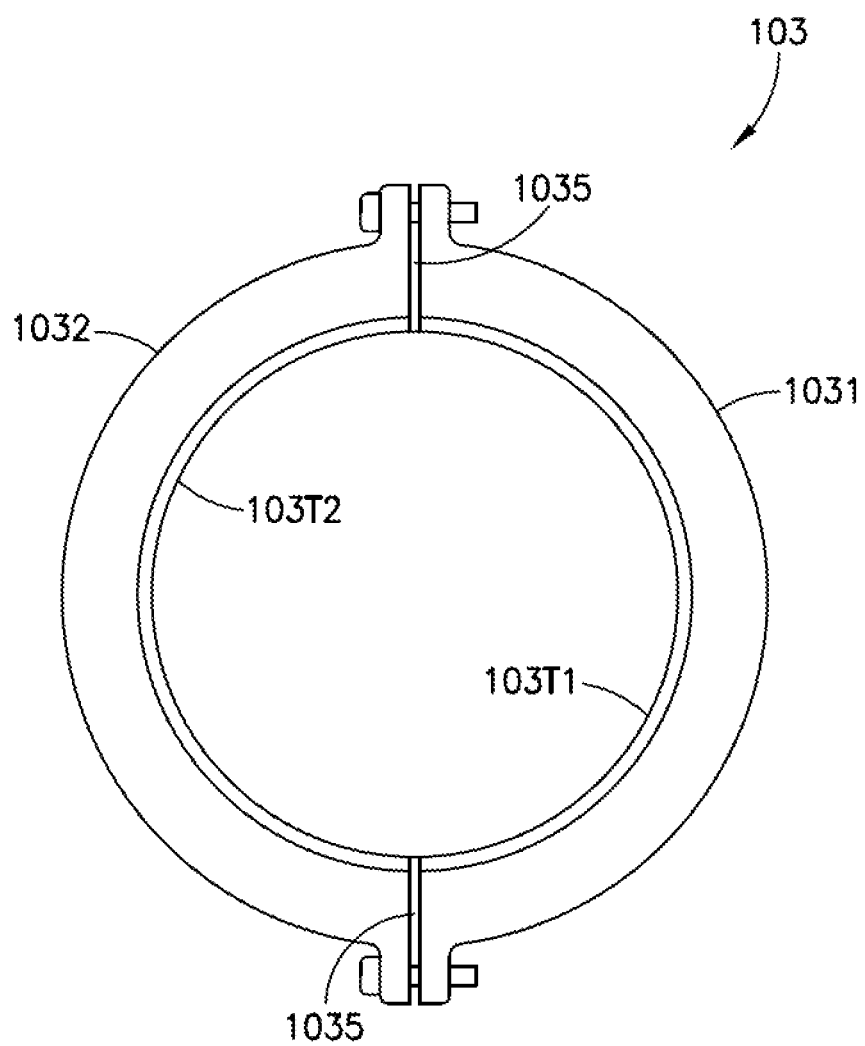
Figure 9:
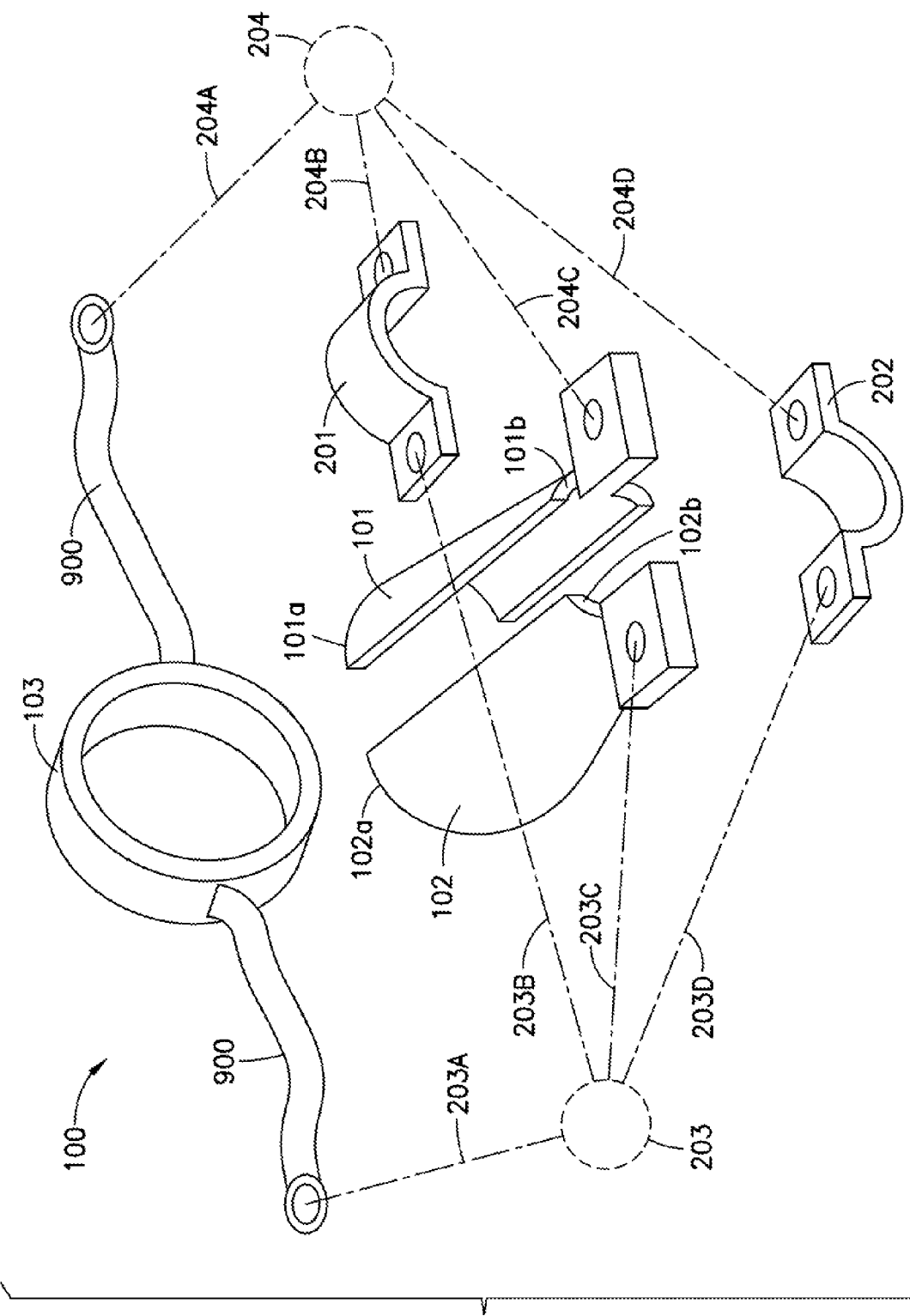
Figure 10C:
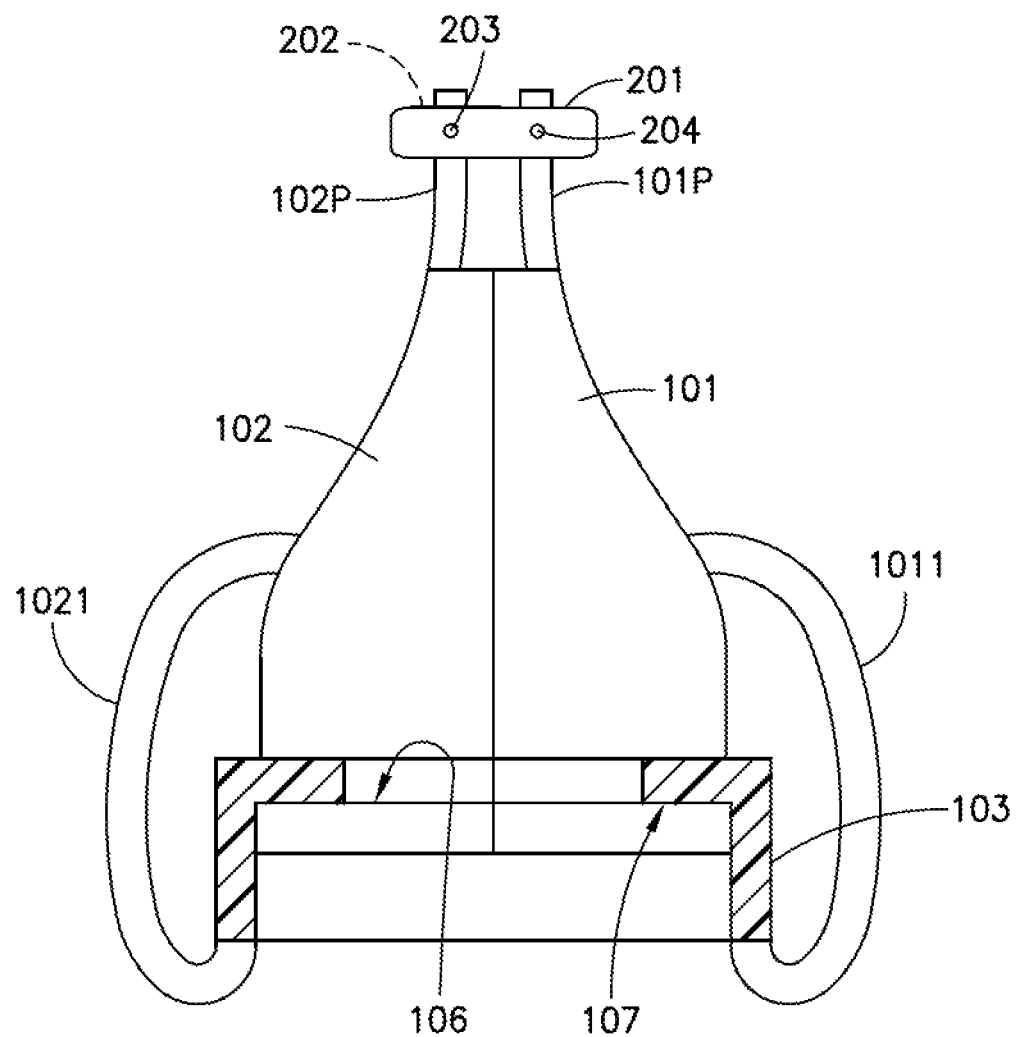
Figure 11:
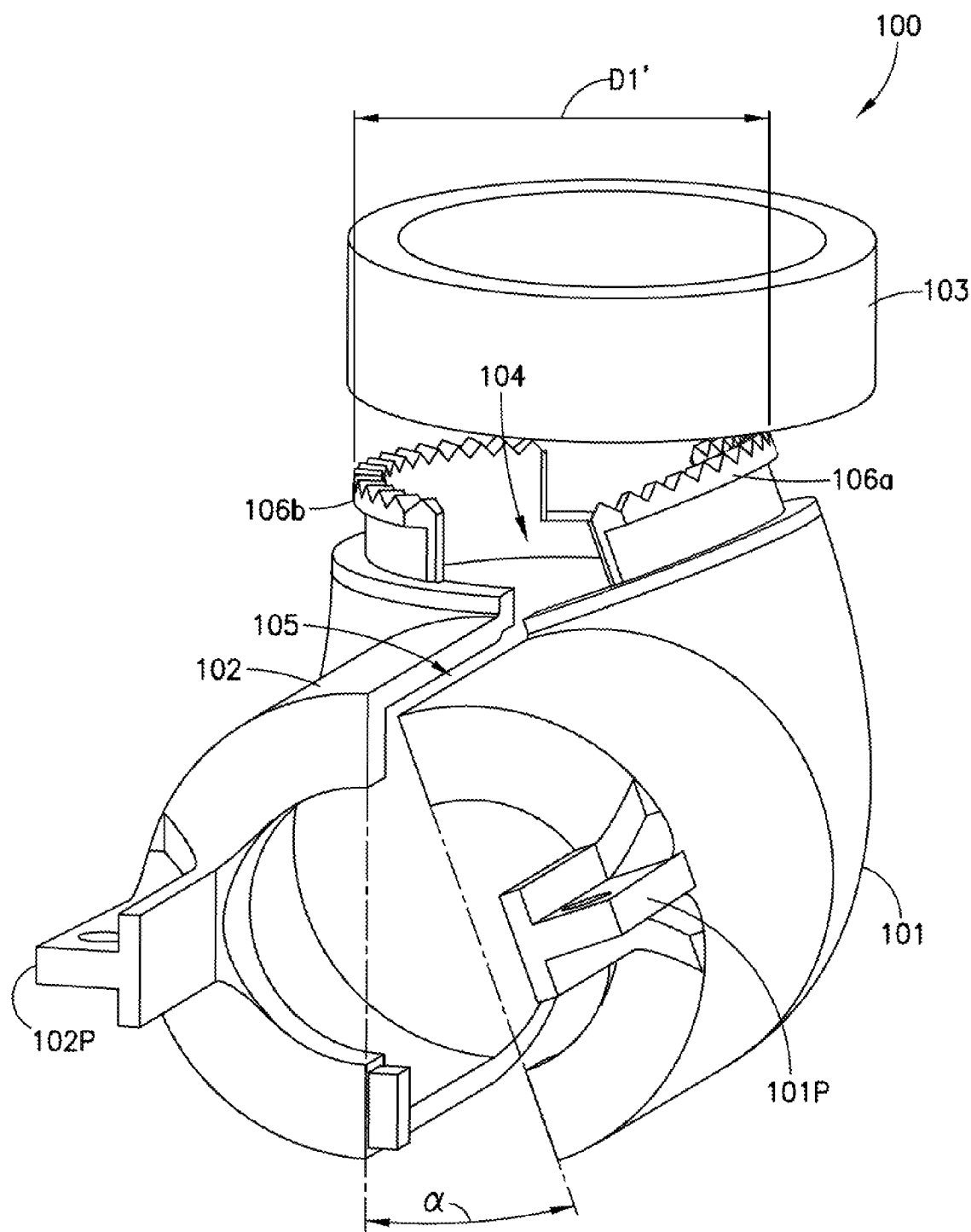
Figure 12:
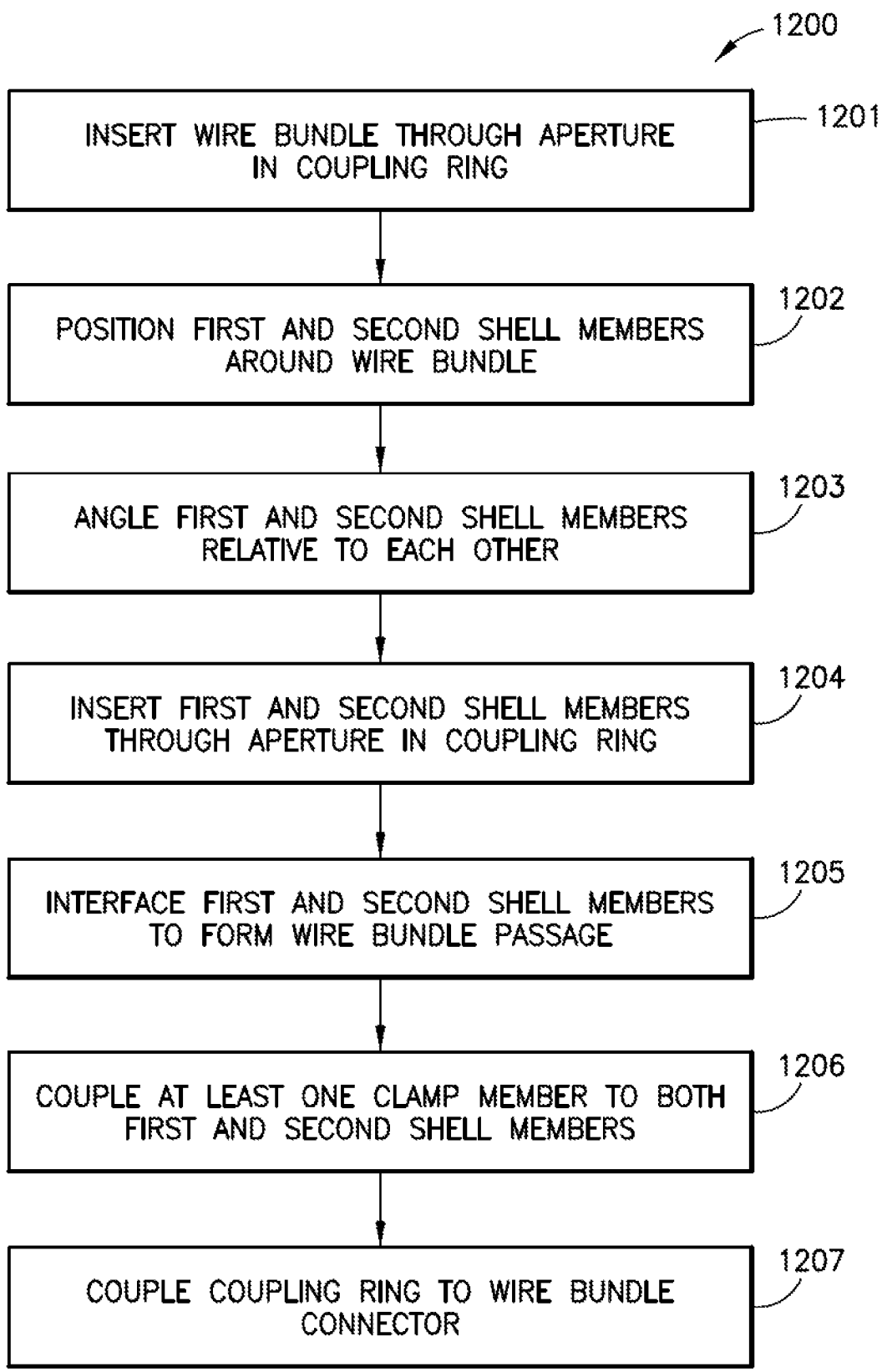
Figure 13:
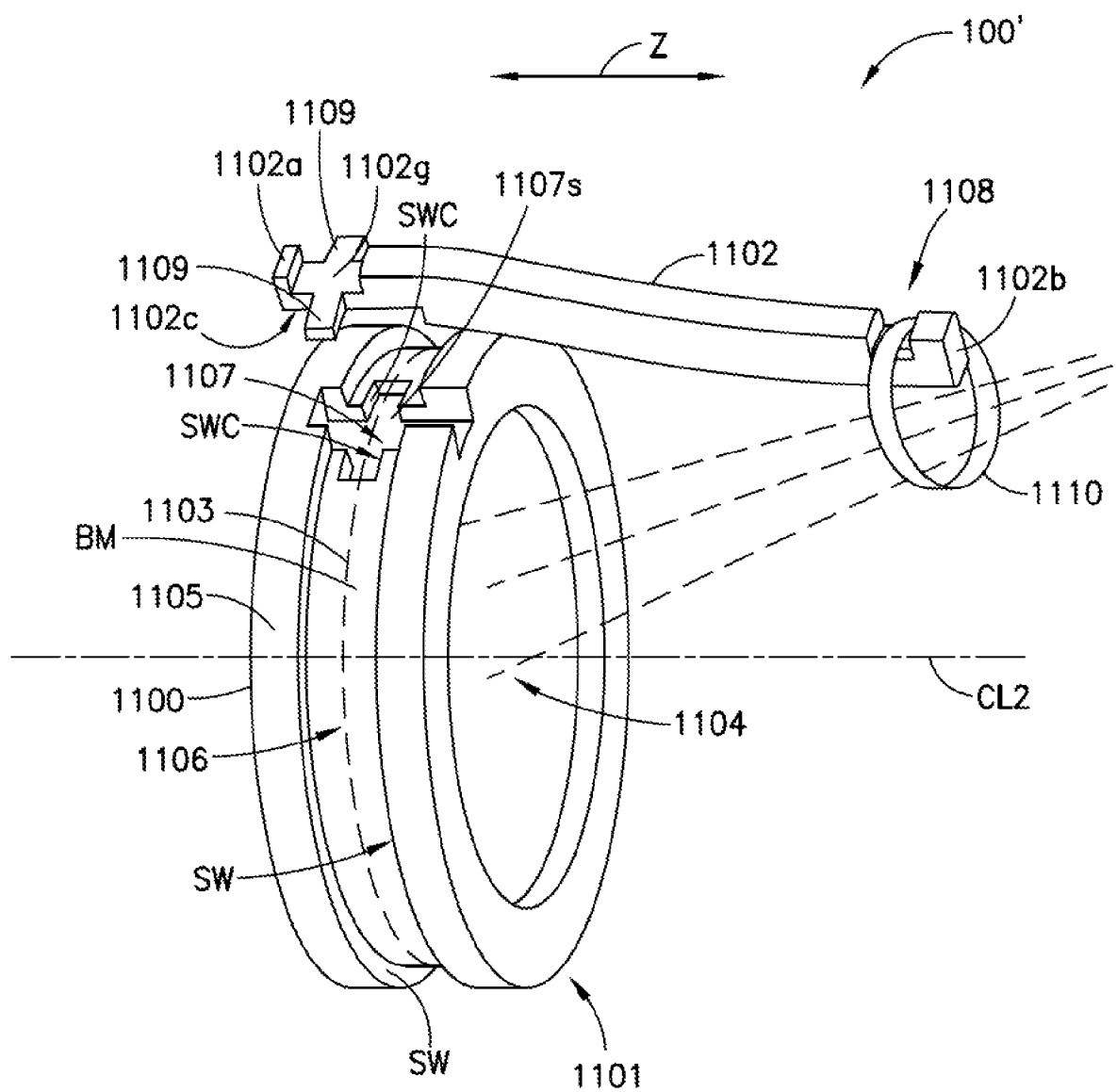
Figure 14:
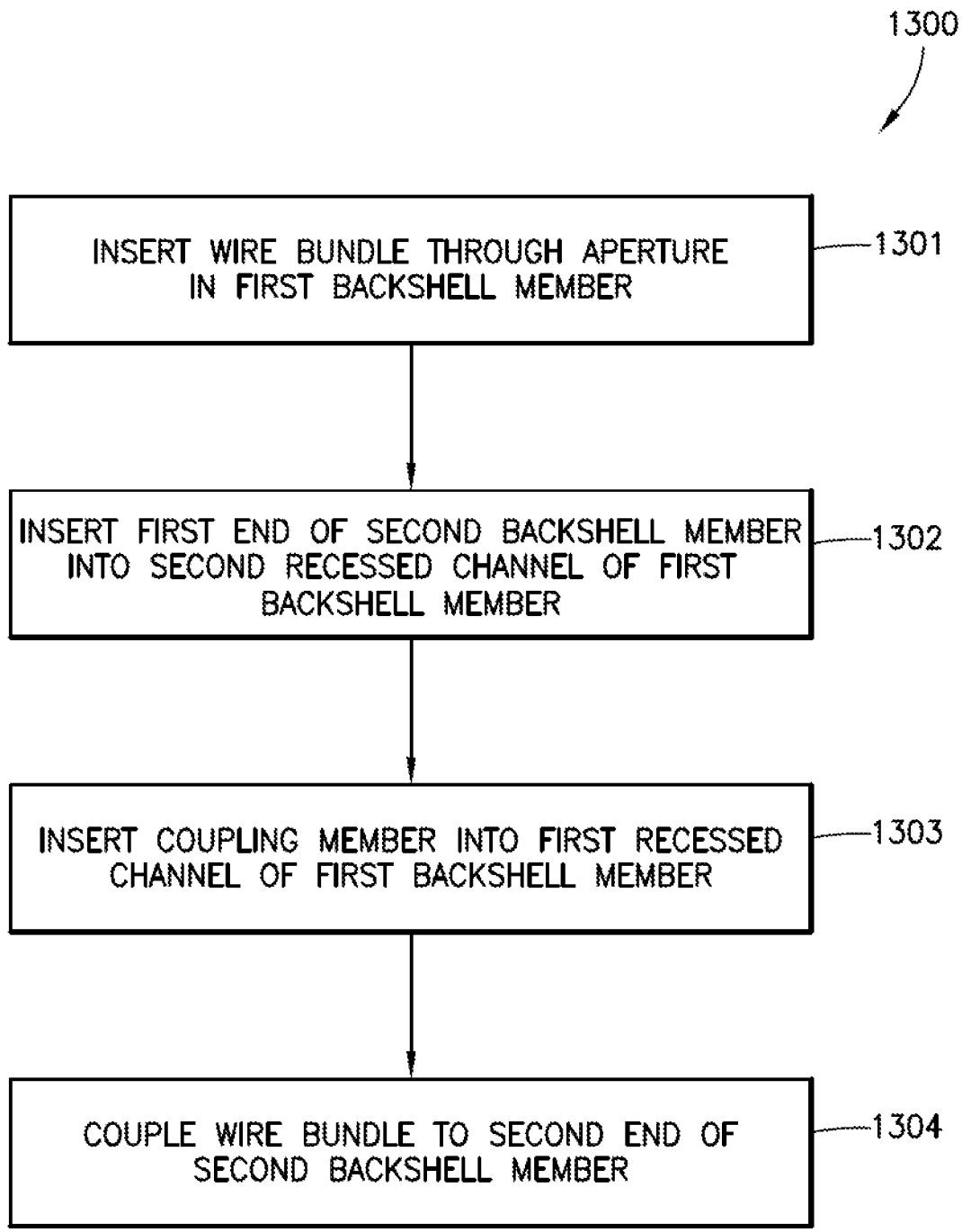
Figure 15:
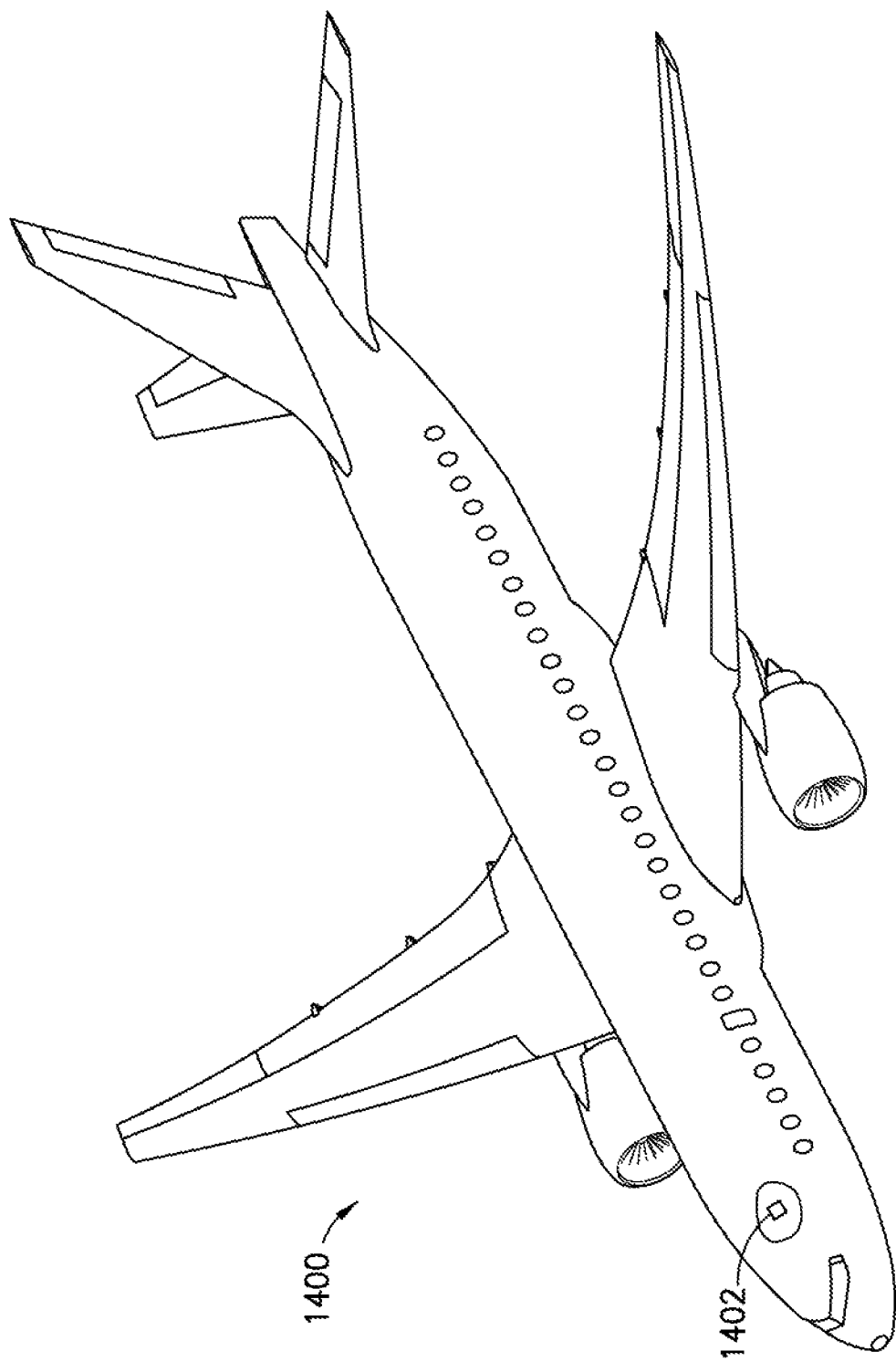
Figure 16:
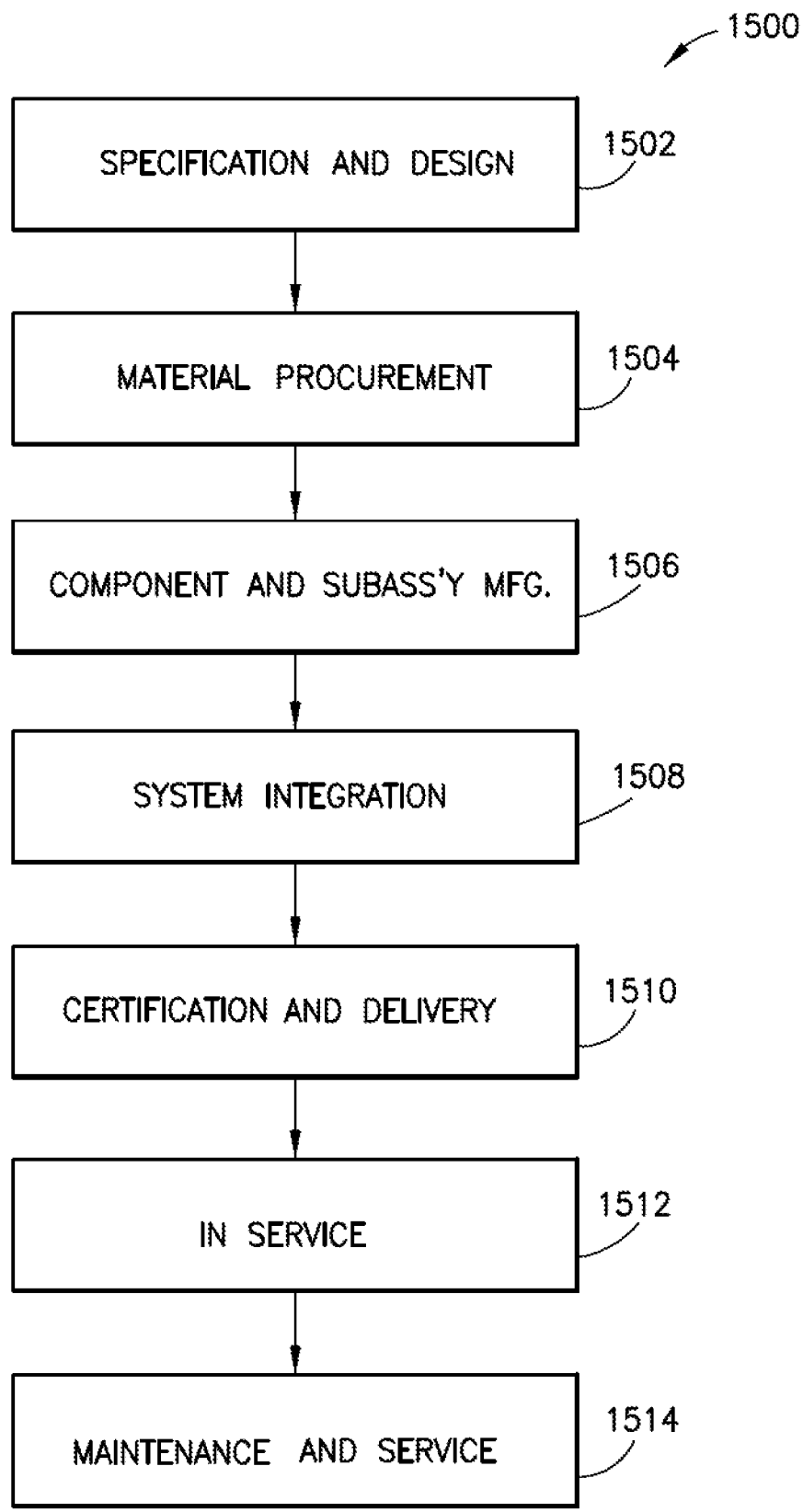

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic illustration of a backshell in accordance with one or more aspects of the present disclosure;

FIG. 2 is a schematic illustration of a backshell in accordance with one or more aspects of the present disclosure;

FIG. 3 is a schematic illustration of a portion of a backshell in accordance with one or more aspects of the present disclosure;

FIGS. 4*a* and 4*b* are schematic illustrations of a portion of a backshell in accordance with one or more aspects of the present disclosure;

FIG. 5 is a schematic illustration of a backshell in accordance with one or more aspects of the present disclosure;

FIG. 6 is a schematic illustration of a backshell in accordance with one or more aspects of the present disclosure;

FIG. 7 is a schematic illustration of a backshell in accordance with one or more aspects of the present disclosure;

FIG. 8 is a schematic illustration of a portion of a backshell in accordance with one or more aspects of the present disclosure;

FIG. 9 is a schematic illustration of a backshell in accordance with one or more aspects of the present disclosure;

FIGS. 10A-10C are schematic illustrations of a backshell in accordance with one or more aspects of the present disclosure;

FIG. 11 is a schematic illustration of a backshell in accordance with one or more aspects of the present disclosure;

FIG. 12 is a flow chart of a method of use for a backshell in accordance with one or more aspects of the present disclosure;

FIG. 13 is a schematic illustration of a backshell in accordance with one or more aspects of the present disclosure;

FIG. 14 is a flow chart of a method of use for a backshell in accordance with one or more aspects of the present disclosure;

FIG. 15 is a schematic illustration of an aircraft in accordance with one or more aspects of the present disclosure; and FIG. 16 is a flow chart of an aircraft production and service methodology.

DETAILED DESCRIPTION

The embodiments described herein may provide an improved backshell 100, 100' which may be installed around a wire or a wire bundle after routing the wire(s) to, and connection with, a wire connector. Illustrative, non-exhaustive examples, which may or may not be claimed, of the subject matter according to the present disclosure are provided below.

Referring to FIGS. 1 and 2, the aspects of the present disclosure described herein disclose a backshell 100 configured to secure and support a wire bundle, and including, for example, strain relief and grounding properties.

In one aspect, the backshell 100 described herein is described with respect to use in an aircraft 1400 electrical system 1402, illustrated in FIG. 15; while in other aspects, the backshell 100 may be applied to other industries, including, but not limited to, automotive industries, maritime industries, and aerospace industries.

In one aspect, the backshell 100 generally includes a first shell member 101 having a first end 101*a*, a second end 101*b*, and a first channel 101*c* extending between the first end 101*a* and the second end 101*b*; a second shell member 102 having a first end 102*a*, a second end 102*b*, and a second channel 102*c* extending between the first end 102*a* and the second end 102*b*; and a coupling ring 103. In one aspect, the backshell 100 also includes at least one protrusion 101*p*, 102*p* and at least one clamp member 201, 202 as will be further described herein.

The first and second shell members 101, 102 and the coupling ring 103 are generally formed from the same material, for example, one or more of a plastic, composite, or metal and formed in any suitable manner such as additive manufacturing, extrusion, molding, machining, etc. In other aspects, the first and second shell members 101, 102 and the coupling ring 103 may be formed from different materials and in any suitable manner. In one aspect, the material forming the backshell 100 provides electromagnetic interference shielding/protection for a wire(s) or wire bundle. In one aspect, the material forming the backshell may be a composite having shielding properties. In one aspect, the electromagnetic interference shielding/protection of the backshell 100 may be a coating deposited on the backshell 100. In one aspect, the electromagnetic interference shielding/protection may include a foam, rubber, and/or resilient block disposed within or around the backshell 100.

In one aspect, the first and second shell members 101, 102 interface so as to form the backshell 100. In one aspect, the first and second shell members 101, 102 interface at parting line 105 formed by edges 101ED, 102ED of the first and second shell members 101, 102 respectively. In one aspect, with the edges 101ED, 102ED of the first and second shell members 101, 102 interfaced at parting line 105, the first end 101*a* of the first shell member 101 and the first end 102*a* of the second shell member 102 are adjacent one another defining a backshell first end 100*a*, while the second end 101*b* of the first shell member 101 and the second end 102*b* of the second shell member 102 are adjacent one another defining a backshell second end 100*b*. In one aspect, parting line 105 extends between the backshell first end 100*a* and the backshell second end 100*b* along a longitudinal plane LP of the backshell 100; while in other aspects, the parting line 105 may be defined by the first shell member 101 and the second shell member 102 in any suitable manner such that the parting line 105 is not necessarily substantially straight. In one aspect, the first and second shell members 101, 102 include attachment features. In one aspect, the attachment features are apertures, through which any suitable fastener passes to couple the first shell member 101 and the second shell member 102. In one aspect, the attachment features are snap fasteners (i.e., a male portion on one member snapping into a female portion on the other member). In one aspect, the attachment features are any suitable fastener device/ mechanism to couple the first shell member 101 to the second shell member 102.

Still referring to FIGS. 1 and 2, in one aspect, the first channel 101c extends from the first end 101a of the first shell member 101 to the second end 101b of the first shell member 101 and has a width CW1 and a depth CD1. In one aspect, the second channel 102c extends from the first end 102a of the second shell member 102 to the second end 102b of the second shell member 102 and has a width CW2 and a depth CD2. In one aspect, the first and second shell members 101, 102 interface, such that the first and second channels 101c, 102c form a wire bundle passage 104 extending between the backshell first end 100a and the backshell second end 100b. In one aspect, each width CW1, CW2 and depth CD1, CD2 corresponds to dimensions of a wire bundle. In other aspects, the widths CW1, CW2 and the depths CD1, CD2 are any suitable width or depth such that one or more wires may pass through the wire bundle passage 104. In one aspect, the widths CW1, CW2 and the depths CD1, CD2 are sized for a wire bundle such that dust and/or debris are substantially prevented from entering the backshell second end 100b.

Referring now to FIGS. 1, 3 and 4a, in one aspect, the first shell member 101 includes a first coupling ring retaining flange portion 106a. In one aspect, the first coupling ring retaining flange portion 106a extends partially, for example, a distance X around a circumference 100C of the backshell first end 100a. In one aspect, the second shell member 102 includes a second coupling ring retaining flange portion 106b. In one aspect, the second coupling ring retaining flange portion 106b extends partially, for example, a distance Y around the circumference 100C of the backshell first end 100a. The first coupling ring retaining flange portion 106a and the second coupling ring retaining flange portion 106b form coupling ring retaining flange 106 when the first and second shell members 101, 102 are interfaced with one another.

In one aspect, the coupling ring retaining flange 106 extends radially outward with respect to a centerline CL1 of the wire bundle passage 104, as seen in FIG. 4a. In one aspect, the coupling ring retaining flange 106 includes at least one protrusion 109 extending from the coupling ring retaining flange 106. In one aspect, the at least one protrusion 109 engages a wire bundle connector 500, for example mating protrusions 509 of the wire bundle connector 500, seen in FIG. 5 and further described below. The at least one protrusion 109 engaging the wire bundle connector 500 prevents the backshell 100 from rotating relative to the wire bundle connector 500 (i.e., the at least one protrusion 109 provides anti-rotation of the backshell 100 relative to the wire bundle connector 500) when, e.g., the coupling ring 103 is fastened to the wire bundle connector 500.

In one aspect, the first coupling ring retaining flange portion 106a and the second coupling ring retaining flange portion 106b, extending only partially around the circumference 100C of the back shell first end 100a, forms one or more gaps 106g between the ends 106ae of the first coupling ring retaining flange portion 106a and the ends 106be of the second coupling ring retaining flange portion 106b. In one aspect, the gap(s) 106g are located adjacent the parting line 105. In one aspect, the gap(s) 106g are sized such that, the first shell member 101 and the second shell member 102 may be angled relative to each other about the parting line 105 for engaging the coupling ring 103 (see FIG. 11) as will be further described below. For example, when angled, the effective circumference or outer diameter D1' (FIG. 11) of the coupling ring retaining flange 106 is smaller than an inner diameter D2 of a backshell retaining flange 107 of the coupling ring 103 to allow passage of the coupling ring retaining flange 106 through the backshell retaining flange 107, as will be described below; but when the first shell member 101 and the second shell member 102 are mated at parting line 105, an interference fit 100IF (i.e., a fit in which there is interference for all tolerance conditions) is formed with the coupling ring 103, such that the circumference or outer diameter D1 (FIG. 4a) of the coupling ring retaining flange 106 is larger than the inner diameter D2 of the backshell retaining flange 107 so that the coupling ring 103 is retained on the first and second shell members 101, 102 through the interference fit 100IF between the coupling ring retaining flange 106 and the backshell retaining flange 107 (the coupling ring retaining flange 106 interfaces with and retains/prevents removal of the backshell retaining flange 107).

In one aspect, the coupling ring retaining flange 106 includes a recess 106R in which the backshell retaining flange 107 is disposed to retain the coupling ring 103 on the first and second shell members 101, 102. The recess 106R retains the backshell retaining flange 107 between a stop surface 106S of the coupling ring retaining flange 106 and a seating surface 101X, 102X of the first and second shell members 101, 102. The recess circumference is substantially similar to the inner diameter D2 of the backshell retaining flange 107 however, maintaining enough clearance between them so that the coupling ring 103 may rotate relative to the first ends 101a, 102a of the first and second shell members 101, 102 when the first and second shell members 101, 102 are interfaced at the parting line 105. The clearance between the backshell retaining flange 107 and the recess 106R may be such that the first and second shell members 101, 102 are held in substantial contact by the backshell retaining flange 107 of the coupling ring 103 when the first and second shell members 101, 102 are interfaced at the parting line 105. In one aspect, the coupling ring 103 rotates relative to the backshell first end 100a in direction 103D.

Referring again to FIGS. 1 and 2, in one aspect, as noted above, the first and second shell members 101, 102 include the at least one protrusion 101P, 102P. In one aspect, protrusions 101P, 102P are in a fixed spatial relationship with and extend a distance XP from a respective second end 101b, 102b of each of the first and second shell members 101, 102. In one aspect, protrusions 101P, 102P are provided to interface with the at least one clamp member 201, 202 as will be further described herein, to couple the first and second shell members 101, 102 to each other where the at least one clamp member 201, 202 and the coupling ring 103 in combination maintain the first and second shell members 101, 102 in substantial contact with each other at the parting line 105.

In one aspect, referring to FIGS. 6 and 7, protrusions 101P, 102P are coupled to each respective first and second shell members 101, 102 by an articulated joint 100AJ, such that protrusions 101P, 102P may rotate relative to the first and second shell members 101, 102 to provide an adjustable routing for the wire(s) of the wire bundle through the backshell 100. In one aspect, protrusions 101P, 102P are rotatable in directions PA1, PA2 about pivot point PP. In one aspect, the articulated joint 100AJ includes one or more anti-rotation members 101S, 102S, such that protrusions 101P, 102P may be locked (e.g., prevent further rotation) into place at any desired angle preventing further rotation about the pivot point PP. For example, protrusions 101P, 102P may be locked into place so that protrusions 101P, 102P are extended in-line with or at about 0 degrees (which may be coincident with the centerline CL1) to the first end(s) 101a, 102a of the first and/or second shell members 101, 102; while in other aspects, protrusions 101P, 102P may be positioned and locked at least about 90 degrees in either direction PA1 or PA2 relative to the first end(s) 101a, 102a of the first and/or second shell members 101, 102 or at any position between +90 degrees and −90 degrees. In still other aspects, protrusions 101P, 102P may be rotatable more than +90 degrees and/or −90 degrees. In one aspect, the one or more anti-rotation members 101S, 102S are self-locking screws. In one aspect, the one or more anti-rotation members 101S, 102S are any suitable anti-rotation mechanism including friction members, toothed members, pins, etc. In one aspect, the backshell 100 includes at least one recess 100I so that with protrusions 101P, 102P rotated about the pivot point PP, the wire(s) or wire bundle may be inserted into the recess 100I to provide a stress free/gradual bend to the wire(s).

Referring now to FIGS. 1, 2, 4b and 5, in one aspect, the at least one clamp member 201, 202 includes two opposing clamp members. In one aspect, the at least one clamp member 201, 202 includes one or more fasteners 203, 204. In one aspect, the one or more fasteners 203, 204 are nuts and bolts, screws, pins or any other suitable fastener(s). In one aspect, the at least one clamp member 201, 202 engages the first and second shell members 101, 102 to couple the first and second shell members 101, 102 to each other. In one aspect, the at least one clamp member 201, 202 engages the first and second shell members 101, 102 at protrusions 101P, 102P. In one aspect, the at least one clamp member 201, 202 includes two opposing clamp members that clamp/engage a wire(s) or wire bundle, passing through the wire bundle passage 104, relative to the backshell 100 to provide strain relief to the connection between the wire(s) and the wire bundle connector 500. In one aspect, the at least one clamp member 201, 202 spans the parting line 105 so that a clamping force of the at least one clamp member 201, 202 does not affect positioning of the first and second shell members 101, 102 relative to one another. In one aspect, a first engagement surface 101E and a second engagement surface 102E on protrusions 101P, 102P are spaced a distance S and engage surfaces 201E, 202E are also spaced a distance S on the at least one clamp member 201, 202, so that the first and second shell members 101, 102 are held together at the backshell second end 100b independent of the clamping force of the at least one clamp member 201, 202.

Referring now to FIGS. 1-3, in one aspect, the coupling ring 103 includes the backshell retaining flange 107 as noted above. In one aspect, the backshell retaining flange 107 extends radially inward relative to a centerline CL2 of the coupling ring 103. In one aspect, the coupling ring 103 engages both the first shell member 101 and the second shell member 102 to couple the first ends 101a, 102a of the first and second shell members 101, 102 to each other. In one aspect, the coupling ring 103 engages both the first and second shell members 101, 102 at the backshell first end 100a of the backshell 100. In one aspect, as described above, the backshell retaining flange 107 engages the coupling ring retaining flange 106 such that the coupling ring 103 is retained by the coupling ring retaining flange 106 of the first and second shell members 101, 102. In one aspect, the coupling ring 103 may engage the first and second shell member 101, 102 at any suitable location to couple the first and second shell members 101, 102 to each other.

In one aspect, the outer circumference or outer diameter D1 of the coupling ring retaining flange 106 is larger than the inner circumference or inner diameter D2 of the backshell retaining flange 107. The outer diameter D1 of the coupling ring retaining flange 106 is larger than the inner diameter D2 of the backshell retaining flange 107 so that the backshell retaining flange 107 is retained in the recess 106R when the first and second shell members 101, 102 are inserted into the coupling ring 103 so that seating surface 107s of the backshell retaining flange 107 engages the stop surface 106s of the coupling ring retaining flange 106.

In one aspect, the seating surface 107S interfaces with the stop surface 106S of the coupling ring retaining flange 106 to prevent the backshell retaining flange 107 from escaping the recess 106R and thus, preventing the coupling ring 103 from detaching from the first and second shell members 101, 102. In one aspect, with the backshell retaining flange 107 retained in the recess 106R, the coupling ring 103 may move longitudinally relative to the first and second shell members 101, 102; however, when the coupling ring 103 is tightened on the wire bundle connector 500 as will be further described below, longitudinal movement is prevented where the seating surface 107s pushes on the stop surface 106s so that the at least one protrusion 109 engage the mating protrusions 509 of the wire bundle connector 500 to prevent rotation of the backshell 100 relative to the wire bundle connector 500.

In one aspect, the coupling ring 103 includes a coupling feature 108 that engages a mating coupling feature 508 of the wire bundle connector 500. In one aspect, coupling feature 108 is a threaded coupling. In one aspect, coupling feature 108 is any suitable engagement mechanism to couple the coupling ring 103 and the retained first and second shell members 101, 102 to, for example, a wire bundle connector 500, as seen in FIG. 5. In one aspect, when the coupling ring 103 is engaged and tightened to the wire bundle connector 500, this engagement may maintain the first shell member 101 and the second shell member 102 in a predetermined relationship relative to each other to prevent the first and second shell member 101, 102 from being removed from the coupling ring 103. In one aspect, the mating protrusions 509 provide support in maintaining the first and second shell members 101, 102 in a predetermined relationship relative to each other, where compressive forces applied to the stop surface 106S by the coupling ring 103 compresses or otherwise holds the coupling ring retaining flange 106 against the wire bundle connector 500 so that the first and second shell members 101, 102 are in substantial contact along the parting line 105 and prevents the first and second shell members 101, 102 from separating and thus, being removed from the coupling ring 103. In one aspect, the coupling ring 103 is a single unitary one piece member but in other aspects, the coupling ring 103 may include more than one piece. For example, referring to FIG. 8, the coupling ring 103 includes a first member 1031 and a second member 1032. Generally, the first member 1031 and the second member 1032 interface at parting line 1035 to form the coupling ring 103. In one aspect, the interface between the first member 1031 and the second member 1032 includes at least one attachment feature 1036, 1037. In one aspect, the at least one attachment feature 1036, 1037 is an aperture, through which any suitable fastener passes to couple the first member 1031 and the second member 1032, or a snap (i.e., a male portion on one member snapping into a female portion on the other member). In one aspect, the at least one attachment feature 1036, 1037 is any suitable fastener device/mechanism to couple the first member 1031 to the second member 1032. In one aspect, each member 1031, 1032 includes threads 103T1, 103T2. In one aspect, the threads 103T1 of the first member 103_1 align with the threads 103T2 of the second member 103_2 so that when the coupling ring 103 is formed (e.g., the first member 103_1 and the second member 103_2 are coupled to each other), the threads 103T1, 1032T2 of each member 103_1, 103_2 form one continuous uninterrupted thread.

In one aspect, referring to FIG. 9, the coupling ring 103 further includes one or more ground wire/strap 900, where the one or more ground wire/strap 900 provides a ground path to electrically bond the first and second shell members 101, 102 to the coupling ring 103 and thus the wire bundle connector 500 as will be further described below with respect to the at least one clamp member 201, 202. In one aspect, the one or more ground wire/strap 900 may be coupled to one or more of the coupling ring 103, the first or second shell members 101, 102, the at least one clamp member 201, 202, and/or any other suitable portion of the backshell 100 so that the one or more coupling ring 103, at least one clamp member 201, 202, and/or first and second shell member 101, 102 is/are grounded through the one or more ground wire/strap 900. In one aspect, the one or more ground wire/strap 900 effectively grounds the coupling ring 103, at least one clamp member 201, 202, and/or first and second shell member 101, 102 to one or more ground points (e.g., the one or more fasteners 203, 204) through one or more conductive pathways schematically illustrated as pathways 203A-d, 204A-D. In one aspect, there may be sufficient conductivity between the coupling ring 103, at least one clamp member 201, 202, and/or first and second shell member 101, 102 so that the one or more ground wire/strap 900 may be coupled to but one of the coupling ring 103, at least one clamp member 201, 202, and/or first and second shell member 101, 102 for grounding the backshell 100. In one aspect, a ground wire 901, disposed within the wire bundle, passing through the backshell 100, is coupled to one or more of the coupling ring 103, the first or second shell members 101, 102, the at least one clamp 201, 202, and/or any other suitable portion of the backshell 100 so that a ground path is provided for the wire bundle through the backshell 100 to the wire bundle connector 500. In one aspect, the ground wire 901 is coupled to the one or more fasteners 203, 204 of the at least one clamp 201, 202 as seen in FIG. 5.

Referring now to FIGS. 10A-10C, in one aspect, the first and second shell members 101, 102 and the coupling ring 103 are formed as a single one piece member. In one aspect, the first and second shell members 101, 102 and the coupling ring 103 are formed of any suitable material, for example plastic, metal, and/or metalized plastic, and formed in any suitable manner, such as, for example, injection molded, additive manufacturing, casting, etc. In one aspect, the coupling ring 103 is attached to each shell member 101, 102 via flexible members 101_1, 102_1, shaped and sized to flex and bend such that the backshell 100 may be laid in an open configuration as seen in FIGS. 10A and 10B. In one aspect, the flexible members 101_1, 102_1 are flexed and/or bent to manipulate and maneuver the first and second shell members 101, 102 into the coupling ring 103 forming a closed configuration, as seen in FIG. 10C, so that the coupling ring retaining flange 106 is inserted through the backshell retaining flange 107 to couple the first and second shell members 101, 102 together in a manner substantially similar to that described below with respect to FIG. 11.

Referring now to FIGS. 11 and 12, a method 1200 for using, for example, backshell 100 is illustrated. In one aspect, a wire or wire bundle for electrical system 1402 of, for example, an aircraft 1400 are passed through the coupling ring 103 (FIG. 12, Block 1201). In one aspect, the coupling ring 103 is coupled to the wire bundle connector 500 and wires are coupled to the wire bundle connector 500 through the coupling ring 103. In one aspect, with respect to the coupling ring 103 illustrated in FIG. 8, the two members of the coupling ring 103 are positioned around the wire or wire bundle and coupled together so that the coupling ring 103 circumscribes the wire or wire bundle.

In one aspect, the first shell member 101 and the second shell member 102 are positioned around the wire or wire bundle (FIG. 12, Block 1202). In one aspect, the first and second shell members 101, 102 are positioned around the wire or wire bundle passing through the coupling ring 103.

In one aspect, as seen in FIG. 11, the first shell member 101 and the second shell member 102 are angled relative to each other (FIG. 12, Block 1203). In one aspect, the first and second shell members 101, 102 may be angled to any angle α relative to each other. In one aspect, the angle α may be adjusted to any suitable angle for insertion of the first and second shell members 101, 102 into the coupling ring 103.

With the first and second shell members 101, 102 angled relative to each other, the first and second shell members 101, 102 are inserted through the backshell retaining flange 107 of the coupling ring 103 (FIG. 12, Block 1204). In one aspect, the first coupling ring retaining flange portion 106a and the second coupling ring retaining flange portion 106b are inserted through the backshell retaining flange 107 of the coupling ring 103 where the coupling ring 103 is coupled to the wire bundle connector 500, the coupling ring 103 may be removed from the wire bundle connector 500 (with wire(s) passing therethrough) for coupling the first and second shell members 101, 102. The wire or wire bundle are inserted into the wire bundle connector 500 through the backshell retaining flange 107 of the coupling ring 103. The coupling ring 103 is decoupled from the wire bundle connector 500 to insert the first ends 101a, 102a of the first shell member 101 and the second shell member 102 through the backshell retaining flange 107 of the coupling ring 103.

With the first and second shell members 101, 102 inserted through the backshell retaining flange 107 of the coupling ring 103, the first shell member 101 and the second shell member 102 are interfaced at the parting line 105 to form the wire bundle passage 104 (FIG. 12, Block 1205) with the wire(s) disposed in the wire bundle passage 104. In one aspect, the coupling ring 103 engages both the first shell member 101 and the second shell member 102 at each respective first end 101a, 102a to couple the first shell member 101 to the second shell member 102.

In one aspect, referring also to FIGS. 6 and 7, an angle of the backshell may be adjusted by rotating protrusions 101P, 102P about the pivot point PP. The angle may be adjusted from about 0 degrees to about 90 degrees or more than about 90 degrees relative to the first and second shell member 101, 102.

The at least one clamp member 201, 202 is coupled to both of the first shell member 101 and the second shell member 102 at the backshell second end 100b to couple the first and second shell members 101, 102 to each other (FIG. 12, Block 1206). In one aspect, the at least one clamp member 201, 202 maintains the first shell member 101 and the second shell member 102 in a predetermined relationship relative to each other to prevent the first ends 101a, 102a of the first and second shell members 101, 102 from being removed from the coupling ring 103.

In one aspect, with the first and second shell members 101, 102 interfaced at the parting line 105 and held in a fixed relationship by at least the coupling ring 103 and/or the at least on clamp member 201, 202, the coupling ring 103 is coupled to the wire bundle connector 500 through engagement between the coupling ring 103 and the wire bundle connector 500 (FIG. 12, Block 1207). In one aspect, as the coupling ring 103 is coupled to the wire bundle connector 500, the at least one protrusion 109 engages the mating protrusions 509 of the wire bundle connector 500 to provide anti-rotation of the backshell 100 relative to the wire bundle connector 500. In one aspect, the at least one clamp member 201, 202 is coupled to the first and second shell members 101, 102 after the backshell 100 is coupled to the wire bundle connector 500, so as to provide secondary support (i.e., maintaining the first and second shell members in a predetermined relationship relative to each other) for the first and second shell members 101, 102 while clamping and securing the wire(s) or wire bundle.

Referring now to FIG. 13, illustrated is backshell 100' in accordance with aspects of the present disclosure.

In one aspect, the backshell 100' generally includes a first backshell member 1101 having a frame 1100, a second backshell member 1102 having a first end 1102a and a second end 1102b, and a coupling member 1103. In one aspect, the frame 1100 forms a ring, which in one aspect, is substantially similar to ring 103, that is configured to couple with a wire bundle connector 500. In one aspect, the frame 1100 couples to the wire bundle connector 500 with threads formed into the frame 1100. In one aspect, the frame 1100 is a split member ring, similar to that described above with respect to backshell 100. In one aspect, the first and second backshell members 1101, 1102 interface to form the backshell 100'.

In one aspect, the first backshell member 1101 also includes an aperture 1104, a circumferential outer surface 1105, a first recessed channel 1106 and a second recessed channel 1107. In one aspect, the first recessed channel 1106 and the second recessed channel 1107 are both disposed in the circumferential outer surface 1105. In one aspect, the first recessed channel 1106 includes side walls SW and a bottom surface BM. In one aspect, the second recessed channel 1107 includes a surface 1107s and extends in direction Z (same direction as the longitudinal direction of the backshell 100') to intersect the first recessed channel 1106. In one aspect, the second recessed channel 1107 is disposed below a surface, such as the bottom surface BM, of the first recessed channel 1106 so as to form a portion of the first recessed channel 1106. In one aspect, the first end 1102a of the second backshell member 1102 has a first channel surface 1102g, a second channel surface 1102c, and at least one protrusion 1109 and interfaces with the second recessed channel 1107, forming a portion of the first recessed channel 1106. In one aspect, the first end 1102a of the second backshell member 1102 occupies the second recessed channel 1107, such that the second channel surface 1102c of the first end 1102a interfaces with the surface 1107s of the second recessed channel 1107, while the first channel surface 1102g forms a portion of the bottom surface BM of the first recessed channel 1106. In one aspect, the at least one protrusion 1109 interfaces with a side wall SWC of the second recessed channel 1107 which prevents longitudinal movement in direction Z of the second backshell member 1102 along the centerline CL2.

In one aspect, the second end 1102b of the second backshell member 1102 includes a retaining recess 1108. In one aspect, the retaining recess 1108 interfaces with the wire bundle to secure the wire bundle to relieve stress upon the wire bundle. In one aspect, a looped strap 1110 is inserted in the retaining recess 1108 and around the wire(s). In one aspect, the looped strap 1110 is tightened to secure the wire(s) to the second backshell member 1102. In one aspect, the retaining recess 1108 prevents longitudinal movement in direction Z of the looped strap 1110 along the centerline CL2.

In one aspect, the coupling member 1103 couples the first end 1102a of the second backshell member 1102 disposed in the second recessed channel 1107 to the first backshell member 1101. In one aspect, the coupling member 1103 is disposed in the first recessed channel 1106 to couple the second backshell member 1102 to the first backshell member 1101. In one aspect, the coupling member 1103 is a tie member, such as a strap that circumferentially extends around the first backshell member 1101 within the first recessed channel 1106 to secure the second backshell member 1102 to the first backshell member 1101. In one aspect, the coupling member 1103 is any suitable fastening member.

Referring now also to FIG. 14, a method 1300 for using, for example, backshell 100' is illustrated.

In one aspect, wire bundles of electrical system 1402 of, for example, an aircraft 1400 are passed through the first backshell member 1101 (FIG. 14, Block 1301) which may be, in one aspect, coupled to the wire bundle connector 500 when wires are passed therethrough. The second backshell member 1102 is inserted into the second recessed channel 1107 (FIG. 14, Block 1302). In one aspect, the coupling member 1103 is inserted into the first recessed channel 1106 of the first backshell member 1101 to hold the second backshell member 1102 within the second recessed channel 1107 (FIG. 14, Block 1303). In one aspect, the wire bundle, passing through the aperture 1104, may be coupled to the second end 1102b of the second backshell member 1102 (FIG. 14, Block 1304).

Examples of the present disclosure may be described in the context of aircraft manufacturing and service method 1500 as shown in FIG. 16. In other aspects, the examples of the present disclosure may be applied in any suitable industry, such as e.g. automotive, maritime, aerospace, electronics manufacturing, construction, etc. With respect to aircraft manufacturing, during pre-production, illustrative method 1500 may include specification and design (block 1502) of aircraft 1400 and material procurement (block 1504). During production, component and subassembly manufacturing (block 1506) and system integration (block 1508) of aircraft 1400 may take place. Thereafter, aircraft 1400 may go through certification and delivery (block 1510) to be placed in service (block 1512). While in service, aircraft 1400 may be scheduled for routine maintenance and service (block 1514). Routine maintenance and service may include modification, reconfiguration, refurbishment, etc. of one or more systems of aircraft 1400 which may include the backshell 100, 100' as described herein.

Each of the processes of illustrative method 1500 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Apparatus(es) and method(s) shown or described herein may be employed during any one or more of the stages of the manufacturing and service method 1500. For example, components or subassemblies corresponding to component and subassembly manufacturing (block 1506) may be fabricated or manufactured in a manner similar to components or subassemblies produced while aircraft 1400 is in service (block 1512). Also, one or more examples of the apparatus(es), method(s), or combination thereof may be utilized during production stages 1506 and 1508, for example, by substantially expediting assembly of or reducing the cost of aircraft 1400. Similarly, one or more examples of the apparatus or method realizations, or a combination thereof, may be utilized, for example and without limitation, while aircraft 1400 is in service (block 1512) and/or during maintenance and service (block 1514).

The following are provided in accordance with the aspects of the present disclosure:

A1. A backshell for a wire bundle, the backshell comprising:

a first shell member having a first end, a second end opposite the first end and a first channel extending between the first end and the second end;

a second shell member having a first end, a second end opposite the first end and a second channel extending between the first end and the second end, the second shell member being configured to interface with the first shell member at a parting line so that, when interfaced, the first end of the first shell member is adjacent the first end of the second shell member and defines a backshell first end, the second end of the first shell member is adjacent the second end of the second shell member and defines a backshell second end, where the parting line extends between the backshell first end and the backshell second end, and the first channel of the first shell member and the second channel of the second shell member form a wire bundle passage extending between the backshell first end and the backshell second end; and a coupling ring configured to engage both the first shell member and the second shell member at the backshell first end to couple the first shell member to the second shell member.

A2. The backshell of paragraph A1, wherein the first shell member interfaced with the second shell member forms an interference fit within the coupling ring, such that an outer diameter of the backshell first end is larger than an inner diameter of the coupling ring.

A3. The backshell of paragraph A2, wherein:

the backshell first end includes a coupling ring retaining flange that extends radially outward with respect to the wire bundle passage; and the coupling ring includes a backshell retaining flange that extends radially inward relative to the wire bundle passage, the backshell retaining flange being configured to engage the coupling ring retaining flange such that the coupling ring is retained by the first shell member and the second shell member.

A4. The backshell of paragraph A3, wherein the coupling ring rotates relative to the backshell first end.

A5. The backshell of paragraph A3, wherein:

the first shell member includes a first coupling ring retaining flange portion that extends partially around the circumference of the backshell first end;

the second shell member includes a second coupling ring retaining flange portion that extends partially around the circumference of the backshell first end; and a gap exists adjacent the parting line between ends of the first coupling ring retaining flange portion and ends of the second coupling ring retaining flange portion.

A6. The backshell of paragraph A5, wherein the gap is sized such that, when the first shell member is angled relative to the second shell member about the parting line, the first coupling ring retaining flange portion and the second coupling ring retaining flange portion pass through an aperture formed by the backshell retaining flange of the coupling ring.

A7. The backshell of paragraph A3, wherein the backshell first end includes at least one protrusion extending from the coupling ring retaining flange.

A8. The backshell of paragraph A7, wherein the at least one protrusion is configured to engage a wire bundle connector and prevent rotation of the backshell relative to the wire bundle connector.

A9. The backshell of paragraph A1, wherein the coupling ring includes at least one coupling feature configured to couple with a wire bundle connector, such that the interface between the at least one coupling feature and the wire bundle connector holds the first shell member and the second shell member together.

A10. The backshell of paragraph A9 wherein the at least one coupling feature is a threaded coupling.

A11. The backshell of paragraph A1, further comprising at least one clamp member configured to engage both of the first shell member and the second shell member at the backshell second end.

A12. The backshell of paragraph A11, wherein the at least one clamp member comprises two opposing clamp members configured to clamp the wire bundle relative to the backshell.

A13. The backshell of paragraph A11, wherein each of the first shell member and the second shell member includes a protrusion extending from a respective second end, the protrusion being configured for coupling with the at least one clamp member.

A14. The backshell of paragraph A1, wherein:

the first shell member includes a first protrusion adjacent the second end of the first shell member that is coupled to the first shell member first end portion by an articulated joint; and the second shell member includes a second protrusion adjacent the second end of the second shell member that is coupled to the second shell member first end portion by an articulated joint;

wherein the articulated joint of the first shell member and the articulated joint of the second shell member are configured such that an angle between the backshell first end and at least one clamp member coupled to the first protrusion and the second protrusion is adjustable.

A15. The backshell of paragraph A1, wherein the coupling ring comprises a first member and a second member, the first member and second member configured to interface to form the coupling ring.

A16. The backshell of paragraph A15, wherein the interface includes at least one screw.

A17. The backshell of paragraph A15, wherein the first member and second member each include threads, threads of one of the first or second member configured to align with the threads of the other of the first or second member so that when the first and second members form the coupling ring, the threads form one continuous thread.

A18. The backshell of paragraph A1, wherein the coupling ring includes at least one ground wire configured to interface with at least one clamp member coupled to the first shell member and the second shell member to ground the backshell.

B1. A backshell for a wire bundle, the backshell comprising:

a first shell member having a first end, a second end opposite the first end and a first channel extending between the first end and the second end;

a second shell member having a first end, a second end opposite the first end and a second channel extending between the first end and the second end, the second shell member being configured to interface with the first shell member at a parting line so that, when interfaced, the first end of the first shell member is adjacent the first end of the second shell member and defines a backshell first end, the second end of the first shell member is adjacent the second end of the second shell member and defines a backshell second end, where the parting line extends between the backshell first end and the backshell second end, and the first channel of the first shell member and the second channel of the second shell member form a wire bundle passage extending between the backshell first end and the backshell second end;

a coupling ring configured to engage both the first shell member and the second shell member at the backshell first end to couple the first shell member to the second shell member; and at least one clamp member configured to engage both of the first shell member and the second shell member at the backshell second end to couple the first shell member to the second shell member, wherein one or more of the coupling ring and the at least one clamp member maintains the first shell member and the second shell member in a predetermined relationship relative to each other to prevent backshell first end removal from the coupling ring.

B2. The backshell of paragraph B1, wherein the first shell member interfaced with the second shell member forms an interference fit within the coupling ring, such that an outer diameter of the backshell first end is larger than an inner diameter of the coupling ring.

B3. The backshell of paragraph B2, wherein:

the backshell first end includes a coupling ring retaining flange that extends radially outward with respect to the wire bundle passage; and the coupling ring includes a backshell retaining flange that extends radially inward relative to the wire bundle passage, the backshell retaining flange being configured to engage the coupling ring retaining flange such that the coupling ring is retained by the first shell member and the second shell member.

B4. The backshell of paragraph B3, wherein the coupling ring rotates relative to the backshell first end.

B5. The backshell of paragraph B3, wherein:

the first shell member includes a first coupling ring retaining flange portion that extends partially around the circumference of the backshell first end;

the second shell member includes a second coupling ring retaining flange portion that extends partially around the circumference of the backshell first end; and a gap exists adjacent the parting line between ends of the first coupling ring retaining flange portion and ends of the second coupling ring retaining flange portion.

B6. The backshell of paragraph B5, wherein the gap is sized such that, when the first shell member is angled relative to the second shell member about the parting line, the first coupling ring retaining flange portion and the second coupling ring retaining flange portion pass through an aperture formed by the backshell retaining flange of the coupling ring.

B7. The backshell of paragraph B3, wherein the backshell first end includes at least one protrusion extending from the coupling ring retaining flange.

B8. The backshell of paragraph B7, wherein the at least one protrusion is configured to engage a wire bundle connector and prevent rotation of the backshell relative to the wire bundle connector.

B9. The backshell of paragraph B1, wherein the coupling ring includes at least one coupling feature configured to couple with a wire bundle connector, such that the interface between the at least one coupling feature and the wire bundle connector holds the first shell member and the second shell member together.

B10. The backshell of paragraph B9 wherein the at least one coupling feature is a threaded coupling.

B11. The backshell of paragraph B1, wherein the at least one clamp member comprises two opposing clamp members configured to clamp the wire bundle relative to the backshell.

B12. The backshell of paragraph B1, wherein each of the first shell member and the second shell member includes a protrusion extending from a respective second end, the protrusion being configured for coupling with the at least one clamp member.

B13. The backshell of paragraph B1, wherein:

the first shell member includes a first protrusion adjacent the second end of the first shell member that is coupled to the first shell member first end portion by an articulated joint; and the second shell member includes a second protrusion adjacent the second end of the second shell member that is coupled to the second shell member first end portion by an articulated joint;

wherein the articulated joint of the first shell member and the articulated joint of the second shell member are configured such that an angle between the backshell first end and the at least one clamp member is adjustable.

B14. The backshell of paragraph B1, wherein the coupling ring comprises a first member and a second member, the first member and second member configured to interface to form the coupling ring.

B15. The backshell of paragraph B14, wherein the interface includes at least one screw.

B16. The backshell of paragraph B14, wherein the first member and second member each include threads, threads of one of the first or second member configured to align with the threads of the other of the first or second member so that when the first and second members form the coupling ring, the threads form one continuous thread.

B17. The backshell of paragraph B1, wherein the coupling ring includes at least one ground wire configured to interface with the at least one clamp member to ground the backshell.

C1. A method of using a backshell, the method comprising:

angling a first shell member relative to a second shell member, where the first shell member has a first end, a second end opposite the first end and a first channel extending between the first end and the second end, the second shell member has a first end, a second end opposite the first end and a second channel extending between the first end and the second end, the second shell member being configured to interface with the first shell member at a parting line so that, when interfaced, the first end of the first shell member is adjacent the first end of the second shell member and defines a backshell first end, the second end of the first shell member is adjacent the second end of the second shell member and defines a backshell second end, where the parting line extends between the backshell first end and the backshell second end, and the first channel of the first shell member and the second channel of the second shell member form a wire bundle passage extending between the backshell first end and the backshell second end;

inserting, with the first shell member and the second shell member angled relative to each other, the backshell first end through an aperture in a coupling ring;

interfacing the first shell member and the second shell member at the parting line to form the wire bundle passage such that the coupling ring engages both the first shell member and the second shell member at the backshell first end to couple the first shell member to the second shell member; and coupling at least one clamp member to both of the first shell member and the second shell member at the backshell second end to couple the first shell member to the second shell member, wherein one or more of the coupling ring and the at least one clamp member maintains the first shell member and the second shell member in a predetermined relationship relative to each other to prevent backshell first end removal from the coupling ring.

C2. The method of paragraph C1, wherein the first shell member and the second shell member are positioned around a wire bundle passing through the coupling ring prior to insertion of the backshell first end through the aperture in the coupling ring.

C3. The method of paragraph C2, further comprising:
coupling the coupling ring to a wire bundle connector;
inserting wires of the wire bundle into the wire bundle connector through the aperture of the coupling ring; and
decoupling/loosening the coupling ring from the wire bundle connector for insertion of the backshell first end through the aperture in the coupling ring.

C4. The method of paragraph C1, further comprising coupling the backshell to a wire bundle connector through engagement between the coupling ring and the wire bundle connector, maintaining the first shell member and the second shell member in a predetermined relationship relative to each other to prevent backshell first end removal from the coupling ring.

C5. The method of paragraph C1, further comprising adjusting an angle between the backshell first end and the backshell second end.

C6. The method of paragraph C5, wherein the angle is adjusted by moving one of the backshell first end and the backshell second end relative to another of the backshell first end and the backshell second end at an articulated joint disposed between the backshell first end and the backshell second end.

C7. The method of paragraph C1, wherein the backshell first end is retained within the coupling ring through engagement between a coupling ring retaining flange of the backshell first end and a backshell retaining flange of the coupling ring.

C8. The method of paragraph C1, further comprising coupling a wire bundle, passing through the wire bundle passage, to a strain relief member coupled to and depending from the coupling ring.

D1. A backshell for a wire bundle, the backshell comprising:
a first backshell member including a frame having an aperture through which the wire bundle passes,
a circumferential outer surface,
a first recessed channel disposed in the outer surface, and
a second recessed channel disposed in the circumferential outer surface and intersecting the first recessed channel;
a second backshell member having a first end and a second end, the first end configured to mate with the second recessed channel and form a portion of the first recessed channel; and
a coupling member configured for insertion into the first recessed channel to couple the second backshell member to the first backshell member.

D2. The backshell of paragraph D1, wherein the second recessed channel is below a surface of the first recessed channel.

D3. The backshell of paragraph D1, wherein the second end of the second backshell member is configured to couple with the wire bundle.

D4. The backshell of paragraph D1, wherein the first recessed channel has side walls and a bottom and the second backshell member forms a portion of the first recessed channel with the side walls and the bottom.

D5. The backshell of paragraph D1, wherein the first backshell member forms a ring configured to couple with a wire connector.

D6. The backshell of paragraph D5, wherein the ring further includes threads to couple the ring to the wire connector.

D7. The backshell of paragraph D5, wherein the ring is a split ring having a first portion and a second portion configured to couple to one another.

D8. The backshell of paragraph D7, wherein the first portion and the second portion each include threads, the threads of one of the first portion or the second portion are configured to align with the threads of the other of the first portion or second portion, so that when the first portion and second portion are coupled, the threads form one continuous thread.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 12, 14 and 16, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 12, 14 and 16 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A backshell for a wire bundle, the backshell comprising:
   a first shell member having a first end, a second end opposite the first end and a first channel extending between the first end and the second end;
   a second shell member having a first end, a second end opposite the first end and a second channel extending between the first end and the second end, the second shell member being configured to interface with the first shell member at a parting line so that, when interfaced,
      the first end of the first shell member is adjacent the first end of the second shell member and defines a backshell first end,
      the second end of the first shell member is adjacent the second end of the second shell member and defines a backshell second end, where the parting line extends between the backshell first end and the backshell second end, and
      the first channel of the first shell member and the second channel of the second shell member form a wire bundle passage extending between the backshell first end and the backshell second end; and
   a coupling ring configured to engage both the first shell member and the second shell member at the backshell first end to couple the first shell member to the second shell member;
   wherein the coupling ring includes at least one coupling feature configured to couple with a wire bundle connector, such that the interface between the at least one coupling feature and the wire bundle connector holds the first shell member and the second shell member together.

2. The backshell of claim 1, wherein the first shell member interfaced with the second shell member forms an interference fit within the coupling ring, such that an outer diameter of the backshell first end is larger than an inner diameter of the coupling ring.

3. The backshell of claim 2, wherein:
the backshell first end includes a coupling ring retaining flange that extends radially outward with respect to the wire bundle passage; and
the coupling ring includes a backshell retaining flange that extends radially inward relative to the wire bundle passage, the backshell retaining flange being configured to engage the coupling ring retaining flange such that the coupling ring is retained by the first shell member and the second shell member.

4. The backshell of claim 3, wherein:
the first shell member includes a first coupling ring retaining flange portion that extends partially around the circumference of the backshell first end;
the second shell member includes a second coupling ring retaining flange portion that extends partially around the circumference of the backshell first end; and
a gap exists adjacent the parting line between ends of the first coupling ring retaining flange portion and ends of the second coupling ring retaining flange portion.

5. The backshell of claim 3, wherein the backshell first end includes at least one protrusion extending from the coupling ring retaining flange.

6. The backshell of claim 3, wherein the coupling ring rotates relative to the backshell first end.

7. The backshell of claim 1, further comprising at least one clamp member configured to engage both of the first shell member and the second shell member at the backshell second end.

8. The backshell of claim 1, wherein:
the first shell member includes a first protrusion adjacent the second end of the first shell member that is coupled to the first shell member first end portion by an articulated joint; and
the second shell member includes a second protrusion adjacent the second end of the second shell member that is coupled to the second shell member first end portion by an articulated joint;
wherein the articulated joint of the first shell member and the articulated joint of the second shell member are configured such that an angle between the backshell first end and at least one clamp member coupled to the first protrusion and the second protrusion is adjustable.

9. The backshell of claim 1, wherein the coupling ring comprises a first member and a second member, the first member and second member configured to interface to form the coupling ring.

10. The backshell of claim 1, wherein the coupling ring includes at least one ground wire configured to interface with at least one clamp member coupled to the first shell member and the second shell member to ground the backshell.

11. A backshell for a wire bundle, the backshell comprising:
a first shell member having a first end, a second end opposite the first end and a first channel extending between the first end and the second end;
a second shell member having a first end, a second end opposite the first end and a second channel extending between the first end and the second end, the second shell member being configured to interface with the first shell member at a parting line so that, when interfaced,
the first end of the first shell member is adjacent the first end of the second shell member and defines a backshell first end,
the second end of the first shell member is adjacent the second end of the second shell member and defines a backshell second end, where the parting line extends between the backshell first end and the backshell second end, and
the first channel of the first shell member and the second channel of the second shell member form a wire bundle passage extending between the backshell first end and the backshell second end;
a coupling ring configured to engage both the first shell member and the second shell member at the backshell first end to couple the first shell member to the second shell member; and
at least one clamp member configured to engage both of the first shell member and the second shell member at the backshell second end to couple the first shell member to the second shell member;
wherein one or more of the coupling ring and the at least one clamp member maintains the first shell member and the second shell member in a predetermined relationship relative to each other to prevent backshell first end removal from the coupling ring, and
wherein the first shell member interfaced with the second shell member forms an interference fit within an interior of the coupling ring, such that an outer diameter of the backshell first end within the interior of the coupling ring is larger than an inner diameter of the coupling ring through which the first shell member and the second shell member extend.

12. The backshell of claim 11, wherein:
the backshell first end includes a coupling ring retaining flange that extends radially outward with respect to the wire bundle passage; and
the coupling ring includes a backshell retaining flange that extends radially inward relative to the wire bundle passage, the backshell retaining flange being configured to engage the coupling ring retaining flange such that the coupling ring is retained by the first shell member and the second shell member.

13. The backshell of claim 12, wherein the coupling ring rotates relative to the backshell first end.

14. The backshell of claim 12, wherein:
the first shell member includes a first coupling ring retaining flange portion that extends partially around the circumference of the backshell first end;
the second shell member includes a second coupling ring retaining flange portion that extends partially around the circumference of the backshell first end; and
a gap exists adjacent the parting line between ends of the first coupling ring retaining flange portion and ends of the second coupling ring retaining flange portion.

15. The backshell of claim 14, wherein the gap is sized such that, when the first shell member is angled relative to the second shell member about the parting line, the first coupling ring retaining flange portion and the second coupling ring retaining flange portion pass through an aperture formed by the backshell retaining flange of the coupling ring.

16. The backshell of claim 11, wherein each of the first shell member and the second shell member includes a protrusion extending from a respective second end, the protrusion being configured for coupling with the at least one clamp member.

17. A method of using a backshell, the method comprising:
- angling a first shell member relative to a second shell member, where
  - the first shell member has a first end, a second end opposite the first end and a first channel extending between the first end and the second end,
  - the second shell member has a first end, a second end opposite the first end and a second channel extending between the first end and the second end, the second shell member being configured to interface with the first shell member at a parting line so that, when interfaced, the first end of the first shell member is adjacent the first end of the second shell member and defines a backshell first end, the second end of the first shell member is adjacent the second end of the second shell member and defines a backshell second end, where the parting line extends between the backshell first end and the backshell second end, and the first channel of the first shell member and the second channel of the second shell member form a wire bundle passage extending between the backshell first end and the backshell second end;
- inserting, with the first shell member and the second shell member angled relative to each other, the backshell first end through an aperture in a coupling ring;
- interfacing the first shell member and the second shell member at the parting line to form the wire bundle passage such that the coupling ring engages both the first shell member and the second shell member at the backshell first end to couple the first shell member to the second shell member; and
- coupling at least one clamp member to both of the first shell member and the second shell member at the backshell second end to couple the first shell member to the second shell member,
- wherein one or more of the coupling ring and the at least one clamp member maintains the first shell member and the second shell member in a predetermined relationship relative to each other to prevent backshell first end removal from the coupling ring.

18. The method of claim 17, wherein the first shell member and the second shell member are positioned around a wire bundle passing through the coupling ring prior to insertion of the backshell first end through the aperture in the coupling ring.

19. The method of claim 18, further comprising:
- coupling the coupling ring to a wire bundle connector;
- inserting wires of the wire bundle into the wire bundle connector through the aperture of the coupling ring; and
- decoupling the coupling ring from the wire bundle connector for insertion of the backshell first end through the aperture in the coupling ring.

20. The method of claim 17, further comprising adjusting an angle between the backshell first end and the backshell second end.

* * * * *